United States Patent
Webb et al.

(10) Patent No.: US 11,489,815 B2
(45) Date of Patent: Nov. 1, 2022

(54) METHODS AND SYSTEMS FOR SYNCHRONIZING STATE AMONGST MONITORING NODES

(71) Applicant: PATH NETWORK INC., Scottsdale, AZ (US)

(72) Inventors: Marshal Webb, Phoenix, AZ (US); Konrad Zemek, Cracow (PL)

(73) Assignee: Path Network Inc., Scottsdale, AZ (US)

(*) Notice: Subject to any disclaimer, the term of this patent is extended or adjusted under 35 U.S.C. 154(b) by 0 days.

(21) Appl. No.: 17/180,830

(22) Filed: Feb. 21, 2021

(65) Prior Publication Data

US 2022/0272071 A1 Aug. 25, 2022

(51) Int. Cl.
H04L 9/40 (2022.01)

(52) U.S. Cl.
CPC ...... H04L 63/0254 (2013.01); H04L 63/1458 (2013.01); H04L 2463/143 (2013.01)

(58) Field of Classification Search
CPC ............. H04L 63/0254; H04L 63/0218; H04L 63/0227; H04L 63/0236; H04L 2463/143; H04L 63/1453
See application file for complete search history.

(56) References Cited

U.S. PATENT DOCUMENTS

| | | | |
|---|---|---|---|
| 6,857,009 B1* | 2/2005 | Ferreria | H04L 69/16 709/224 |
| 7,398,389 B2 | 7/2008 | Teal et al. | |
| 7,979,528 B2* | 7/2011 | Eisenberg | H04L 63/0209 709/224 |
| 9,525,701 B2* | 12/2016 | Mishra | H04L 47/22 |
| 10,015,136 B2 | 7/2018 | Arkko et al. | |
| 10,620,241 B2* | 4/2020 | Pietrowicz | H04L 43/028 |
| 10,904,167 B2* | 1/2021 | Tsirkin | G06F 9/45558 |
| 11,082,364 B2 | 8/2021 | Pope et al. | |
| 11,228,668 B2* | 1/2022 | Brouer | H04L 69/16 |
| 11,281,485 B2* | 3/2022 | Kumar | H04L 63/20 |
| 2010/0212005 A1 | 8/2010 | Eswaran et al. | |
| 2015/0358284 A1 | 12/2015 | Arkko et al. | |
| 2019/0141061 A1 | 5/2019 | Krishtal et al. | |
| 2019/0253445 A1 | 8/2019 | Mukerji et al. | |

(Continued)

OTHER PUBLICATIONS

Beckett, David et al. "eBPF/XDP", Netronome, SIGCOMM 2018, 41 pgs.

(Continued)

Primary Examiner — Hosuk Song
(74) Attorney, Agent, or Firm — Loza & Loza, LLP

(57) ABSTRACT

Methods and systems for synchronizing state information amongst monitoring nodes for DDoS attack mitigation are disclosed. Embodiments of the present technology may include a method for synchronizing state information amongst monitoring nodes, the method including identifying a packet as a state-related packet by inspecting the packet below a TCP/IP stack in a monitoring node and implementing state synchronization operations below the TCP/IP stack of the monitoring node in response to identifying the packet as a state-related packet, wherein the state synchronization operations include updating an allowlist stored as a key-value map in the monitoring node based on the identified packet and generating a state update packet based on the identified packet.

41 Claims, 22 Drawing Sheets

(56) References Cited

U.S. PATENT DOCUMENTS

| | | | |
|---|---|---|---|
| 2019/0349395 A1 | 11/2019 | Be'Ery et al. |
| 2020/0186563 A1 | 6/2020 | Convertino et al. |
| 2020/0374310 A1 | 11/2020 | Misra et al. |
| 2021/0058424 A1 | 2/2021 | Chang et al. |
| 2021/0152594 A1 | 5/2021 | Doron et al. |
| 2021/0226988 A1 | 7/2021 | Aviv et al. |
| 2021/0258284 A1 | 8/2021 | Pope et al. |
| 2021/0266343 A1 | 8/2021 | St. Pierre |
| 2021/0352044 A1 | 11/2021 | Asveren et al. |

OTHER PUBLICATIONS

Bertin, Gilberto, "XDP in practice: integrating XDP into our DDoS mitigation pipeline", Published 2017, 5 pgs.

Brouer, Jesper Dangaard et al. "A practical introduction to XDP", Linux Plumbers Conference (LPC) Vancouver, Nov. 2018, 31 pgs.

Choudhury, Diptanu Gon, "XDPP-Programmable Data Path in the Linux Kernel", ;login: (Spring 2018) vol. 43, No. 1, 6 pgs.

Kicinski, Jakub et al. "eBPF Hardware Offload to SmartNICs: cls bpf and XDP", (2016), 6 pgs.

Miano, Sebastiano et al."Introducing SmartNICs in Server-Based Data Plane Processing: The DDoS Mitigation Use Case", IEEE Access, vol. 7, (2019), pp. 107161-107170.

Nedim, Šabić, "eBPF and XDP for Processing Packets at Bare-metal Speed", https://sematext.com/blog/ebpf-and-xdp-for-processing-packets-at-bare-metal-speed/, Published Jun. 3, 2019, 8 pgs.

Scholz, Dominik et al. "Me Love (SYN-)Cookies: SYN Flood Mitigation in Programmable Data Planes", Mar. 2020, 13 pgs.

Vieira, Marcos A. M. et al. "Fast Packet Processing with eBPF and XDP: Concepts, Code, Challenges, and Applications", ACM Computing Surveys, vol. 53, No. 1, Article 16. Publication date: Dec. 2019, 38 pgs.

Van Wieren, Huub, "Signature-Based DDoS Attack Mitigation: Automated Generating Rules for Extended Berkeley Packet Filter and Express Data Path", Master Thesis, Nov. 26, 2019, 38 pgs.

International Search Report and Written Opinion for PCT/US2022/016856, dated Jun. 2, 2022; 9 pages.

\* cited by examiner

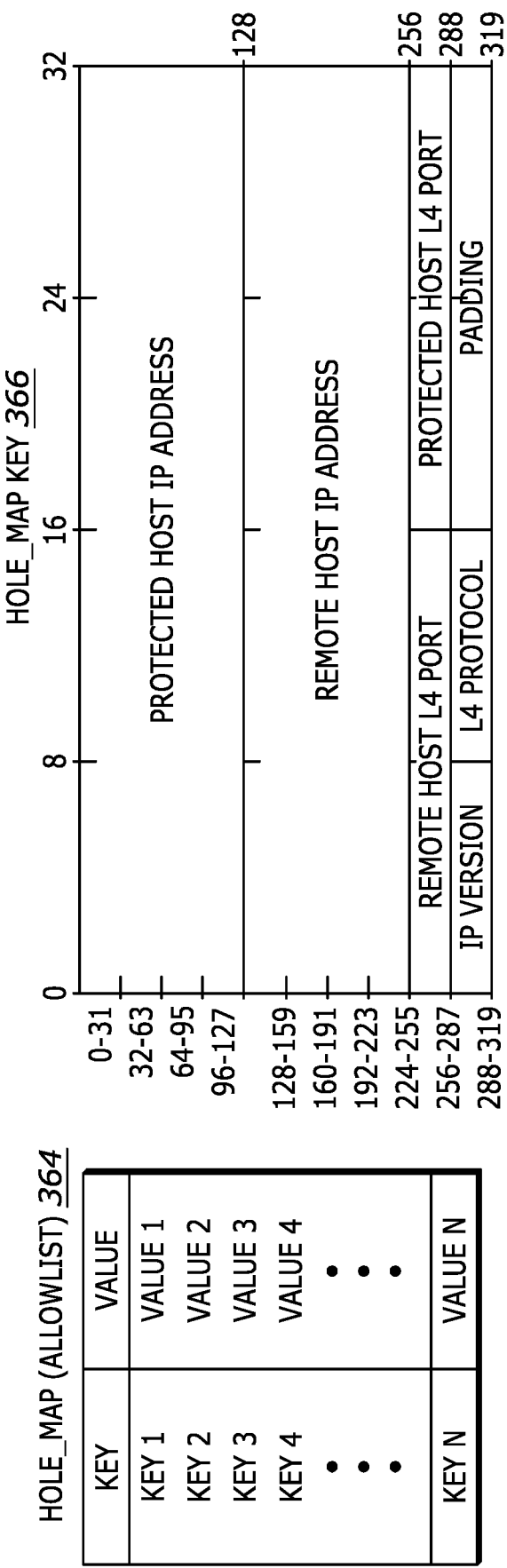
FIG. 12A
FIG. 12B
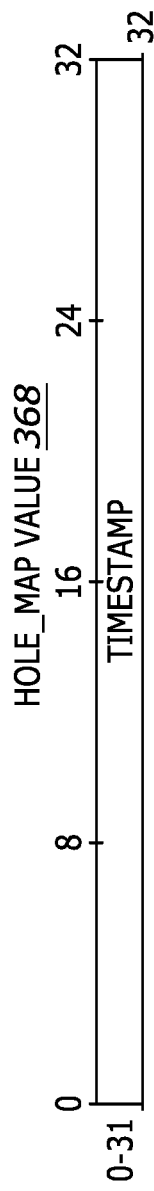
FIG. 12C

METHODS AND SYSTEMS FOR SYNCHRONIZING STATE AMONGST MONITORING NODES

BACKGROUND

Distributed Denial of Service (DDoS) attacks are pervasive across the Internet, are rapidly evolving, and can quickly degrade the service provided by Internet-accessible servers. Devices such as Internet-accessible servers can be protected from such DDoS attacks by a firewall device, which filters packets that are determined to be malicious. However, in a network that includes multiple different firewall devices active in parallel (e.g., active in parallel within the same Point-of-Presence (PoP) and/or active in parallel across multiple PoPs), it can be challenging to identify malicious packets and to update the access lists of all of the firewall devices rapidly enough to effectively ward off DDoS attacks.

SUMMARY

Methods and systems for synchronizing state information amongst monitoring nodes for DDoS attack mitigation are disclosed. Embodiments of the present technology may include a method for synchronizing state information amongst monitoring nodes, the method including identifying a packet as a state-related packet by inspecting the packet below a TCP/IP stack in a monitoring node and implementing state synchronization operations below the TCP/IP stack of the monitoring node in response to identifying the packet as a state-related packet, wherein the state synchronization operations include updating an allowlist stored as a key-value map in the monitoring node based on the identified packet and generating a state update packet based on the identified packet.

In some embodiments, implementing the state synchronization operations below the TCP/IP stack involves executing kernel-space code to read header information of the packet from a receive buffer of a network interface card (NIC) of the monitoring node before any memory is allocated for the packet in a socket buffer of the monitoring node. In some embodiments, implementing the state synchronization operations below the TCP/IP stack involves executing an eXpress Data Path (XDP) program in the kernel-space of the monitoring node.

In some embodiments, implementing the state synchronization operations below the TCP/IP stack involves executing an XDP program in a NIC of the monitoring node. In some embodiments, the monitoring node is located at a first Point-of-Presence (PoP). In some embodiments, generating a state update packet includes generating an inter-site state update packet for updating state information at a monitoring node at a second PoP and generating a local state update packet for updating state information at a different monitoring node in the first PoP.

Embodiments of the present technology may also include a method for synchronizing state information amongst monitoring nodes, the method including at a first monitoring node. Embodiments may also include identifying a packet as a state-related packet by inspecting the packet below a TCP/IP stack of the first monitoring node. Embodiments may also include implementing state synchronization operations below the TCP/IP stack of the first monitoring node in response to identifying the packet as a state-related packet. In some embodiments, the state synchronization operations include updating a map of the first monitoring node based on the identified packet, and generating a state update packet based on the identified packet. Embodiments may also include transmitting the state update packet from the first monitoring node. Embodiments may also include at a second monitoring node. Embodiments may also include receiving the state update packet that was transmitted from the first monitoring node. Embodiments may also include identifying the state update packet as a state-related packet by inspecting the state update packet below a TCP/IP stack of the second monitoring node. Embodiments may also include implementing a state synchronization operation below the TCP/IP stack of the second monitoring node in response to identifying the state update packet as a state-related packet. In some embodiments, the state synchronization operation includes updating a map in the kernel-space of the second monitoring node based on the state update packet.

In some embodiments, identifying a packet as a state-related packet and implementing state synchronization operations in the kernel-space of the first monitoring node involves executing eBPF bytecode in the kernel-space of the first monitoring node. Embodiments may also include identifying the state update packet as a state-related packet and implementing the state synchronization operations in the kernel-space of the second monitoring node involves executing eBPF bytecode in the kernel-space of the second monitoring node.

In some embodiments, identifying the state update packet as a state-related packet and implementing the state synchronization operations in the kernel-space of the second monitoring node involves executing an XDP program. In some embodiments, identifying the state update packet as a state-related packet and implementing the state synchronization operations in the kernel-space of the second monitoring node involves executing kernel-space code at the second monitoring node to read header information of the state update packet from a receive buffer of a NIC of the second monitoring node.

In some embodiments, identifying the state update packet as a state-related packet and implementing the state synchronization operations in the kernel-space of the second monitoring node involves executing an XDP program to read header information of the state update packet from a receive buffer of a NIC of the second monitoring node. In some embodiments, identifying the state update packet as a state-related packet and implementing the state synchronization operations at the second monitoring node involves executing an XDP program in a NIC of the second monitoring node.

In some embodiments, implementing a state synchronization operation below the TCP/IP stack of the second monitoring node may also include generating a local state update packet at the second monitoring node and further including transmitting the local state update packet from the second monitoring node. In some embodiments, the local state update packet is generated via execution of eBPF bytecode in the kernel-space of the second monitoring node.

In some embodiments, the local state update packet is generated via execution of an XDP program in the kernel-space of the second monitoring node. In some embodiments, the local state update packet is generated via execution of an XDP program in a NIC of the second monitoring node. In some embodiments, identifying the packet as a state-related packet at the first monitoring node involves determining that the packet is received on a trusted interface and determining that the packet is a soliciting packet based on header information of the packet.

In some embodiments, identifying the packet as a state-related packet and implementing state synchronization operations at the first monitoring node involves executing eBPF code in the kernel-space of the first monitoring node. In some embodiments, the map represents an allowlist and further including at least one of dropping packets that are received at an untrusted interface of the first monitoring node and that do not correspond to an entry on the allowlist maintained at the first monitoring node and dropping packets that are received at an untrusted interface of the second monitoring node and that do not correspond to an entry on the allowlist maintained at the second monitoring node. In some embodiments, packets are dropped in response to packet processing below the TCP/IP stack that utilizes the allowlist. In some embodiments, the packet processing involves executing an XDP program to read header information of packets from a receive buffer of a NIC of the first and second monitoring nodes.

Embodiments of the present technology may also include a method for synchronizing state information amongst monitoring nodes, the method including at a first monitoring node. Embodiments may also include identifying a packet as a state-related packet by inspecting the packet in a kernel-space of the first monitoring node. Embodiments may also include implementing state synchronization operations in the kernel-space of the first monitoring node in response to identifying the packet as a state-related packet. In some embodiments, the state synchronization operations include updating a map in the kernel-space of the first monitoring node based on the identified packet, and generating a state update packet based on the identified packet. Embodiments may also include transmitting the state update packet from the first monitoring node. Embodiments may also include at a second monitoring node. Embodiments may also include receiving the state update packet that was transmitted from the first monitoring node. Embodiments may also include identifying the state update packet as a state-related packet by inspecting the state update packet in a kernel-space of the second monitoring node. Embodiments may also include implementing a state synchronization operation in the kernel-space of the second monitoring node in response to identifying the state update packet as a state-related packet. In some embodiments, the state synchronization operation includes updating a map in the kernel-space of the second monitoring node based on the state update packet.

In some embodiments, identifying a packet as a state-related packet and implementing state synchronization operations in the kernel-space of the first monitoring node involves executing eBPF bytecode in the kernel-space of the first monitoring node. Embodiments may also include identifying the state update packet as a state-related packet and implementing the state synchronization operations in the kernel-space of the second monitoring node involves executing eBPF bytecode in the kernel-space of the second monitoring node.

In some embodiments, identifying the state update packet as a state-related packet and implementing the state synchronization operations in the kernel-space of the second monitoring node involves executing an XDP program. In some embodiments, identifying the state update packet as a state-related packet and implementing the state synchronization operations in the kernel-space of the second monitoring node involves executing kernel-space code at the second monitoring node to read header information of the state update packet from a receive buffer of a NIC of the second monitoring node.

In some embodiments, identifying the state update packet as a state-related packet and implementing the state synchronization operations in the kernel-space of the second monitoring node involves executing an XDP program to read header information of the state update packet from a receive buffer of a NIC of the second monitoring node. In some embodiments, implementing a state synchronization operation in the kernel-space of the second monitoring node may also include generating a local state update packet in the kernel-space of the second monitoring node and further including transmitting the local state update packet from the second monitoring node.

In some embodiments, the local state update packet is generated via execution of eBPF bytecode in the kernel-space of the second monitoring node. In some embodiments, the local state update packet is generated via execution of an XDP program in the kernel-space of the second monitoring node. In some embodiments, identifying the state update packet as a state-related packet and generating the local state update packet involves executing kernel-space code at the second monitoring node to read header information of the state update packet from a receive buffer of a network interface card (NIC) of the second monitoring node.

In some embodiments, identifying the state update packet as a state-related packet and generating the local state update packet in the kernel-space of the second monitoring node involves executing an XDP program to read header information of the state update packet from a receive buffer of a NIC of the second monitoring node. In some embodiments, identifying the packet as a state-related packet at the first monitoring node involves determining that the packet is received on a trusted interface and determining that the packet is a soliciting packet based on header information of the packet.

In some embodiments, identifying the packet as a state-related packet and implementing state synchronization operations at the first monitoring node involves executing eBPF code in the kernel-space of the first monitoring node. In some embodiments, the map represents an allowlist and further including at least one of dropping packets that are received at an untrusted interface of the first monitoring node and that do not correspond to an entry on the allowlist maintained at the first monitoring node and dropping packets that are received at an untrusted interface of the second monitoring node and that do not correspond to an entry on the allowlist maintained at the second monitoring node. In some embodiments, packets are dropped in response to in-kernel packet processing that utilizes the allowlist. In some embodiments, the in-kernel packet processing involves executing an XDP program to read header information of packets from a receive buffer of a NIC of the first and second monitoring nodes.

Embodiments of the present technology may also include a non-transitory computer readable medium that stores computer-executable code, which when executed on one or more processors, implements a method for synchronizing state information amongst monitoring nodes, the method including at a first monitoring node. Embodiments may also include identifying a packet as a state-related packet by inspecting the packet in a kernel-space of the first monitoring node. Embodiments may also include implementing state synchronization operations in the kernel-space of the first monitoring node in response to identifying the packet as a state-related packet. In some embodiments, the state synchronization operations include updating a map in the kernel-space of the first monitoring node based on the identified packet, and generating a state update packet based on the identified packet. Embodiments may also include transmitting the state update packet from the first monitoring node. Embodiments may also include at a second monitoring node. Embodiments may also include receiving the state update packet that was transmitted from the first monitoring node. Embodiments may also include identifying the state update packet as a state-related packet by inspecting the state update packet in a kernel-space of the second monitoring node. Embodiments may also include implementing a state synchronization operation in the kernel-space of the second monitoring node in response to identifying the state update packet as a state-related packet. In some embodiments, the state synchronization operation includes updating a map in the kernel-space of the second monitoring node based on the state update packet.

Embodiments of the present technology may also include a non-transitory computer readable medium that stores computer-executable code, which when executed on one or more processors, implements a method for synchronizing state information amongst monitoring nodes, the method including at a first monitoring node. Embodiments may also include identifying a packet as a state-related packet by inspecting the packet below a TCP/IP stack of the first monitoring node. Embodiments may also include implementing state synchronization operations below the TCP/IP stack of the first monitoring node in response to identifying the packet as a state-related packet. In some embodiments, the state synchronization operations include updating a map of the first monitoring node based on the identified packet, and generating a state update packet based on the identified packet. Embodiments may also include transmitting the state update packet from the first monitoring node. Embodiments may also include at a second monitoring node. Embodiments may also include receiving the state update packet that was transmitted from the first monitoring node. Embodiments may also include identifying the state update packet as a state-related packet by inspecting the state update packet below a TCP/IP stack of the second monitoring node. Embodiments may also include implementing a state synchronization operation below the TCP/IP stack of the second monitoring node in response to identifying the state update packet as a state-related packet. In some embodiments, the state synchronization operation includes updating a map in the kernel-space of the second monitoring node based on the state update packet.

Embodiments of the present technology may also include a non-transitory computer readable medium that stores computer-executable code, which when executed on one or more processors, implements a method for synchronizing state information amongst monitoring nodes, the method including identifying a packet as a state-related packet by inspecting the packet in a kernel-space of a monitoring node. Embodiments may also include implementing state synchronization operations in the kernel-space of the monitoring node in response to identifying the packet as a state-related packet. In some embodiments, the state synchronization operations include updating a map in the kernel-space of the monitoring node based on the identified packet and generating a state update packet in the kernel-space of the monitoring node based on the identified packet.

Embodiments of the present technology may also include a method for synchronizing state information amongst monitoring nodes, the method including identifying a packet as a state-related packet by inspecting the packet below a TCP/IP stack in a monitoring node that is located at a first Point-of-Presence (PoP). Embodiments may also include implementing state synchronization operations below the TCP/IP stack of the monitoring node in response to identifying the packet as a state-related packet. In some embodiments, the state synchronization operations include. Embodiments may also include generating an inter-site state update packet for updating state information at a monitoring node at a second PoP and transmitting the inter-site state update packet from the monitoring node. Embodiments may also include generating a local state update packet for updating state information at a different monitoring node in the first PoP and transmitting the local state update packet from the monitoring node.

Other aspects in accordance with the invention will become apparent from the following detailed description, taken in conjunction with the accompanying drawings, illustrated by way of example of the principles of the invention.

BRIEF DESCRIPTION OF THE DRAWINGS

FIG. 12A depicts an example of a map in which keys are mapped to corresponding values.

FIG. 12B depicts an example of a key from the map of FIG. 12A.

FIG. 12C depicts an example of a value from the map of FIG. 12A.

Throughout the description, similar reference numbers may be used to identify similar elements.

DETAILED DESCRIPTION

Figure 1:
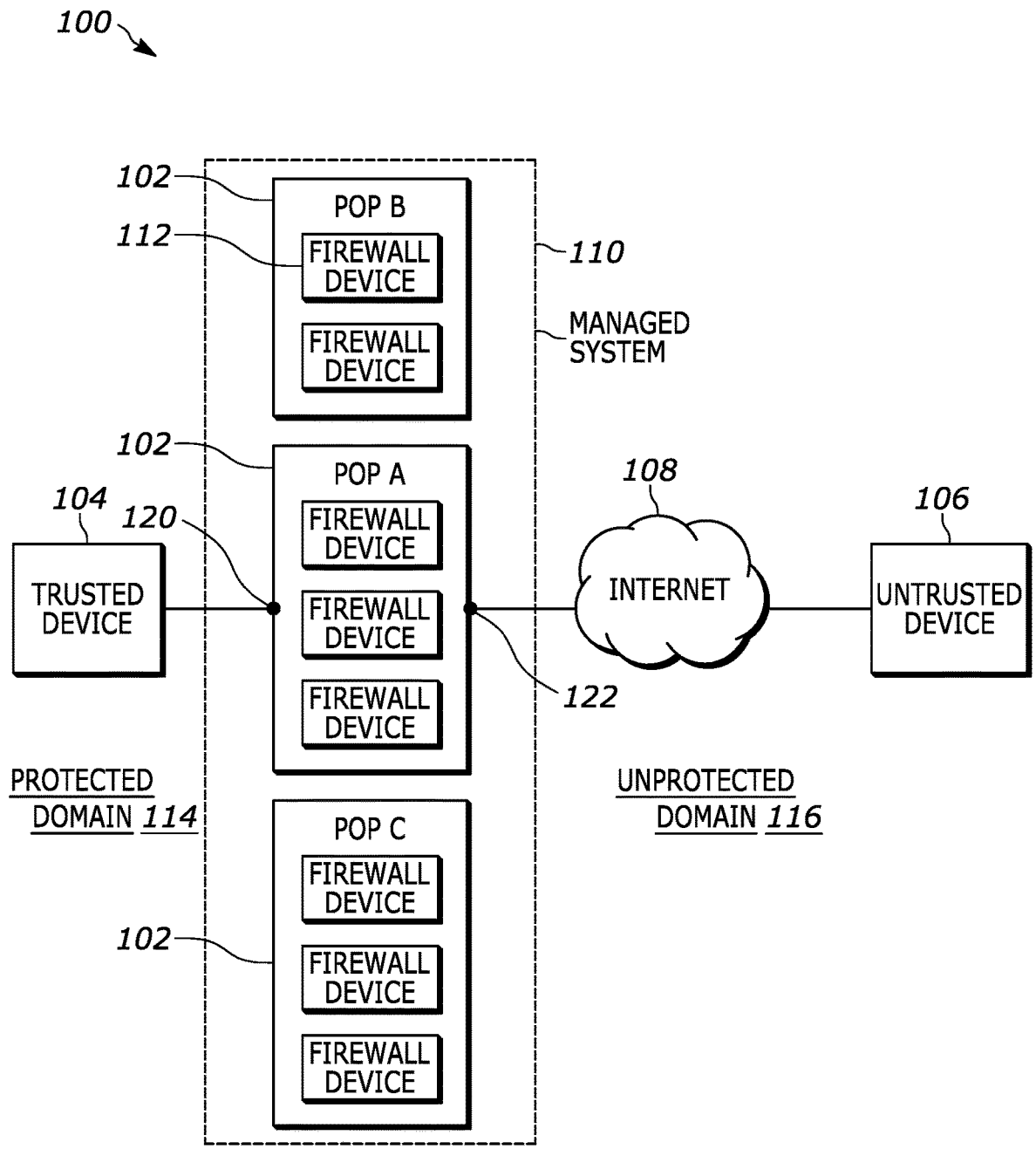
FIG. 1 illustrates a network that includes a PoP that is connected between a trusted device and an untrusted device.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

A common way to secure an Internet-exposed server is to apply firewall rules that allow all outgoing network traffic, but block all incoming network traffic unless the incoming traffic was solicited by some outgoing traffic, e.g., the incoming traffic is somehow related or connected to the outgoing traffic. Such a set of rules is very powerful as it mitigates (barring volumetric attacks that overwhelm network capacity) nearly all Denial of Service attacks that do not target a specific service exposed by the server to the Internet. Such a set of rules, however, relies on an assumption that the firewall device sees both the outgoing traffic and the incoming traffic for the server, which may be satisfied when a firewall is a part of the server itself or installed in-line between the server and its Internet peer. Relying on a single server to see the connection between all outgoing and incoming traffic can be difficult when, due to a distributed, high-capacity and high-availability design of a network, a single firewall device only has a partial view of the server's network traffic.

A case of particular concern is when a network address range is anycasted, i.e., the network address range is announced to the Internet from several distinct locations, and when network filtering by necessity of scale happens at the network edge (e.g., at the location where a network data packet first enters an autonomous system that performs the filtering) by multiple devices that share the load of filtering in a single location, e.g., a single PoP. In such a particular case, not only does a single firewall device not necessarily see both incoming and outgoing traffic for a protected server (e.g., as the incoming traffic may be processed at location closer to the client, not to the server), but the single firewall device also does not necessarily see all incoming or outgoing traffic for a particular client-server pair (e.g., as parts of the incoming and outgoing traffic may be load balanced to different devices in a single PoP). A technique for synchronizing state information across multiple filtering devices, such as firewall devices, is described below.

FIG. 1 illustrates a network 100 that includes a PoP 102 that is connected between a trusted device 104 and an untrusted device 106. Additionally, the untrusted device is connected to the PoP via the Internet 108, or via some other wide area network (WAN). As shown in FIG. 1 and as is described below, multiple PoPs may be connected to each other to form a managed system 110 in which all of the PoPs are managed by the same entity, e.g., by the same Internet Service Provider (ISP). The PoPs include firewall devices 112, which filter network traffic to create a protected domain 114 for devices connected behind the firewall devices while the domain in front of the firewall devices is accessible via the Internet and thus represents an unprotected domain 116.

In an embodiment, the PoPs 102 are local access points for an ISP 108. PoPs may include routers and access servers that enable clients to access the Internet. Each PoP shown in FIG. 1 also includes at least one firewall device 112 that is configured to filter packet traffic incoming via the Internet. In an embodiment, the firewall devices include a host computer, such as a server and at least one Network Interface Controller/Card (NIC). In an embodiment, a NIC may be a "SmartNIC" that includes a programmable system-on-chip (SoC) multi-core processor that is capable of running its own operating system such as Linux. For example, the SmartNIC runs its own operating system separate from a host computing system such as a server to which the SmartNIC is connected.

In the example of FIG. 1, the PoP 102, PoP A, includes a trusted interface 120 that faces the protected domain 114, and an untrusted interface 122 that faces the unprotected domain 116. In an embodiment, a trusted interface is trusted in that it can be assumed that traffic received at the interface from outside the PoP is not malicious at least with regard to DDoS attacks and an untrusted interface is untrusted in that it cannot be assumed that traffic received at the interface from outside the PoP is not malicious. In an embodiment, interfaces may be physical interfaces or virtual interfaces as is known in the field. In an embodiment, trusted and untrusted interfaces may utilize the same physical interface.

In an embodiment, the trusted device 104 may be a server that initiates connections with other devices (e.g., untrusted devices 106) via the Internet 108. In an embodiment, the trusted device may be a monitoring server that establishes connections with monitored devices, or a Linux server that communicates with Network Time Protocol (NTP)/Domain Name Server (DNS) servers, or pulls updates from remote devices. Additionally, the trusted device may be a Virtual Private Network (VPN) server that establishes connections on behalf of its users. Although some examples of trusted devices are provided, the trusted device may be another type of device that generates packets that solicit some kind of response/reply, which are referred to herein as "soliciting" packets.

The untrusted device 106 may be any device that is connected to the Internet 108. The untrusted device may include devices that are targets of a service provided by the trusted device and/or the untrusted device may include malicious devices that are used to launch attacks such as DDoS attacks. In some embodiments, untrusted devices are devices that have been maliciously invaded by a bot that is programmed to participate in DDoS attacks.

Figure 2:
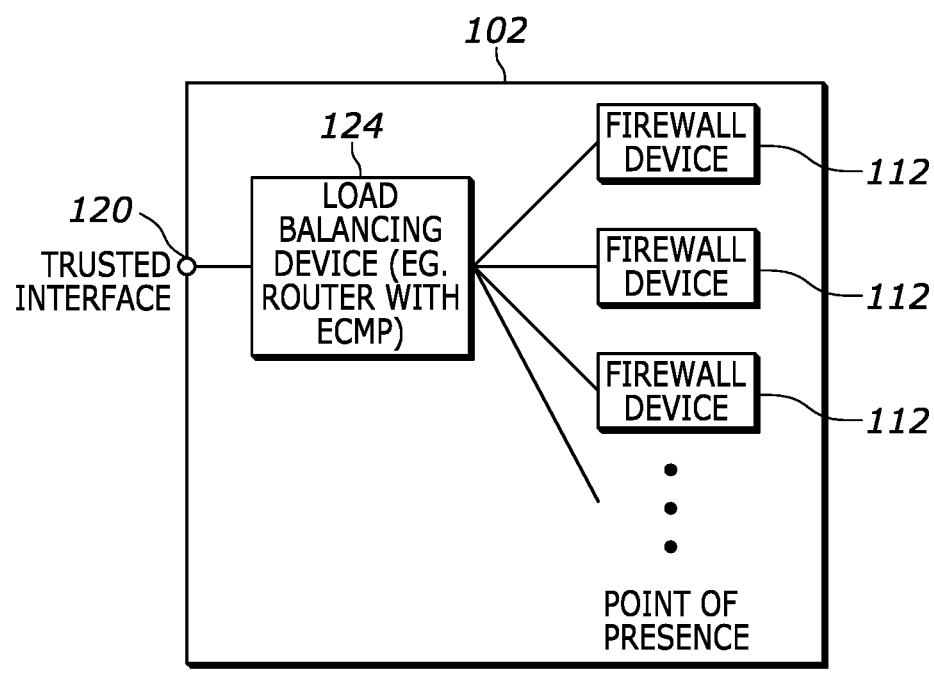
FIG. 2 depicts an expanded view of a PoP from FIG. 1 in which the PoP includes a load-balancing device.

FIG. 2 depicts an expanded view of a PoP 102 from FIG. 1 in which the PoP includes a load-balancing device 124, such as an equal-cost multipath routing protocol (ECMP) router, which distributes traffic received on an interface (e.g., a trusted interface 120) amongst the different firewall devices 112 within the PoP. PoPs that include load-balancing devices are common in many hyperscale cloud networks. Because packets received on the interface could be distributed to any one of the firewall devices, it is important that the state of the filters of each firewall device is synchronized across all of the firewall devices.

Referring back to FIG. 1, in some cases, it may be desirable to have multiple trusted devices that are accessible from the Internet via anycasting through multiple different PoPs, such as PoPs that are geographically distributed to provide a high quality of service over a wide geographic area. Additionally, it may be desirable to have certain aspects of the PoPs function consistently across the multiple PoPs. For example, with regard to DDoS attacks, it may be desirable to have all of the firewall devices across multiple different PoPs utilize synchronized access control lists, e.g., allowlists and/or denylists. In such cases, it may be desirable that the collection of PoPs function as an autonomous system. In the example of FIG. 1, all of the PoPs 102 are accessible from the Internet.

As noted above, DDoS attacks are pervasive across the Internet, are rapidly evolving, and can quickly degrade the service provided by Internet-accessible servers. In a network that includes multiple different firewall devices active in parallel (e.g., active in parallel within the same PoP and/or active in parallel across multiple PoPs), it has been realized that DDoS attacks can be effectively mitigated across multiple firewall devices in a managed system by rapidly identifying soliciting packets and quickly distributing state update information to the multiple firewall devices in the managed system. In accordance with an embodiment of the invention, effective DDoS attack mitigation is achieved by implementing state synchronization operations at very low levels (e.g., below the TCP/IP stack, which involves low levels of abstraction and/or low levels of overhead) in multiple firewall devices across a managed system so that state related information is rapidly identified, distributed, and used to update the firewall devices across the entire managed system. For example, the firewall devices are programmed to block incoming traffic except for traffic that has been identified as legitimate traffic and thus, performance of the firewall devices in the managed system is a function of the speed at which state updates of legitimate traffic can be identified, distributed, and installed in the firewall devices throughout the managed system. In an embodiment, multiple firewall devices are programmed using extended Berkeley Packet Filter (eBPF) and eXpress Data Path (XDP), which execute below the TCP/IP stack in the kernel-space and/or in a NIC, to implement state synchronization operations at such low levels in the firewall devices (e.g., low levels of abstraction and/or low levels of overhead) that allowlists of the firewall devices can be synchronized across a geographically distributed managed system fast enough to ensure that legitimate traffic can pass through the firewall devices while maintaining protection from DDoS attacks. In an embodiment, allowlists maintained in the kernel-space and/or in the NIC of firewall devices are populated by identifying soliciting packets that are received at trusted interfaces as state-related packets and then adding entries into a key-value map that is maintained in the kernel-space and/or in the NIC of the firewall devices. For example, allowlists in the form of key-value maps are synchronized amongst multiple firewall devices across multiple PoPs using eBPF bytecode and an XDP program executed at low levels in the kernel-space of the firewall devices and/or in a NIC of the firewall devices without involvement from the network stack (e.g., the TCP/IP stack) or any user-space code, which enables state synchronization operations to be implemented at or near the line rate of a network interface, e.g., a NIC of the firewall device. In an embodiment, allowlists are used by XDP packet processors in the kernel-space and/or in the NIC of the firewall devices in the managed system to mitigate DDoS attacks by blocking incoming packets received on untrusted interfaces unless the incoming packets were previously solicited by packets received at a trusted interface of at least one firewall device in the managed system.

In an embodiment, the firewall devices can be configured to block all of the incoming packets received on untrusted interfaces of a PoP in the managed system (with some limited exceptions for state update packets and/or certain allowlisted traffic) unless the incoming packets were solicited by a packet (referred to as a "soliciting" packet) received on a trusted interface of a PoP in the managed system. What constitutes a soliciting packet is described in more detail below with reference to FIGS. 7A-9B.

Figure 3:
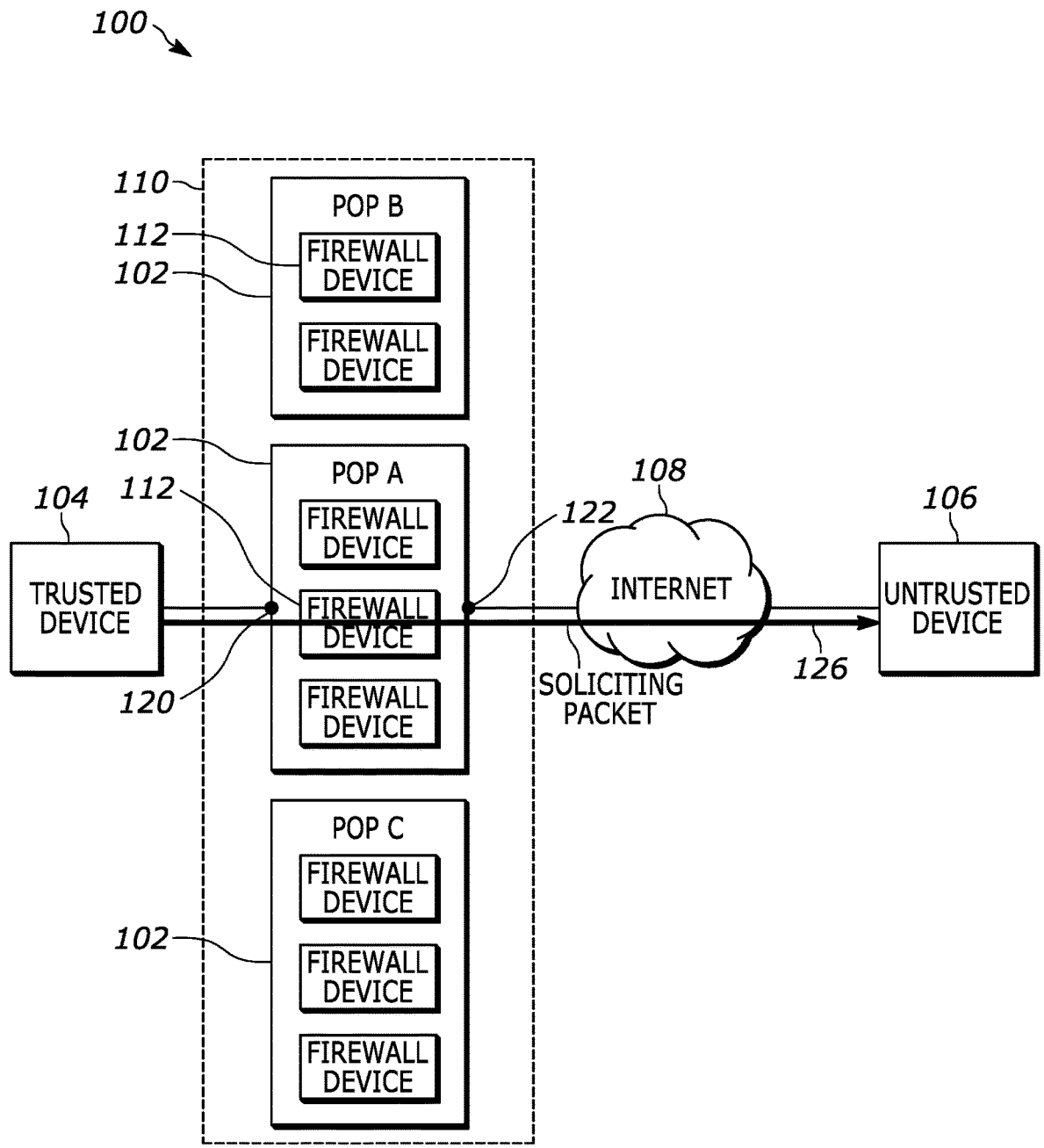
FIG. 3 illustrates network traffic transmitted from a trusted device through a PoP, including through a firewall device of the PoP, to an untrusted device.

For now, the larger context of the state synchronization operation is described with reference to FIGS. 1-6. FIG. 3 illustrates network traffic 126, e.g., a packet being transmitted from the trusted device 104 through a PoP 102, including through a firewall device 112 of the PoP, to the untrusted device 106 via the Internet 108. In the example of FIG. 3, the packet from the trusted device is a soliciting packet, which is expected to trigger the untrusted device to send some traffic, e.g., at least one packet, back to the trusted device in response. As is described below, the corresponding firewall device 112 identifies the packet as a soliciting packet, which triggers the firewall device to implement state synchronization operations. State synchronization operations implemented by the firewall device may include updating its own local allowlist and generating state update packets that are transmitted to other firewall devices in the managed system.

Figure 4:
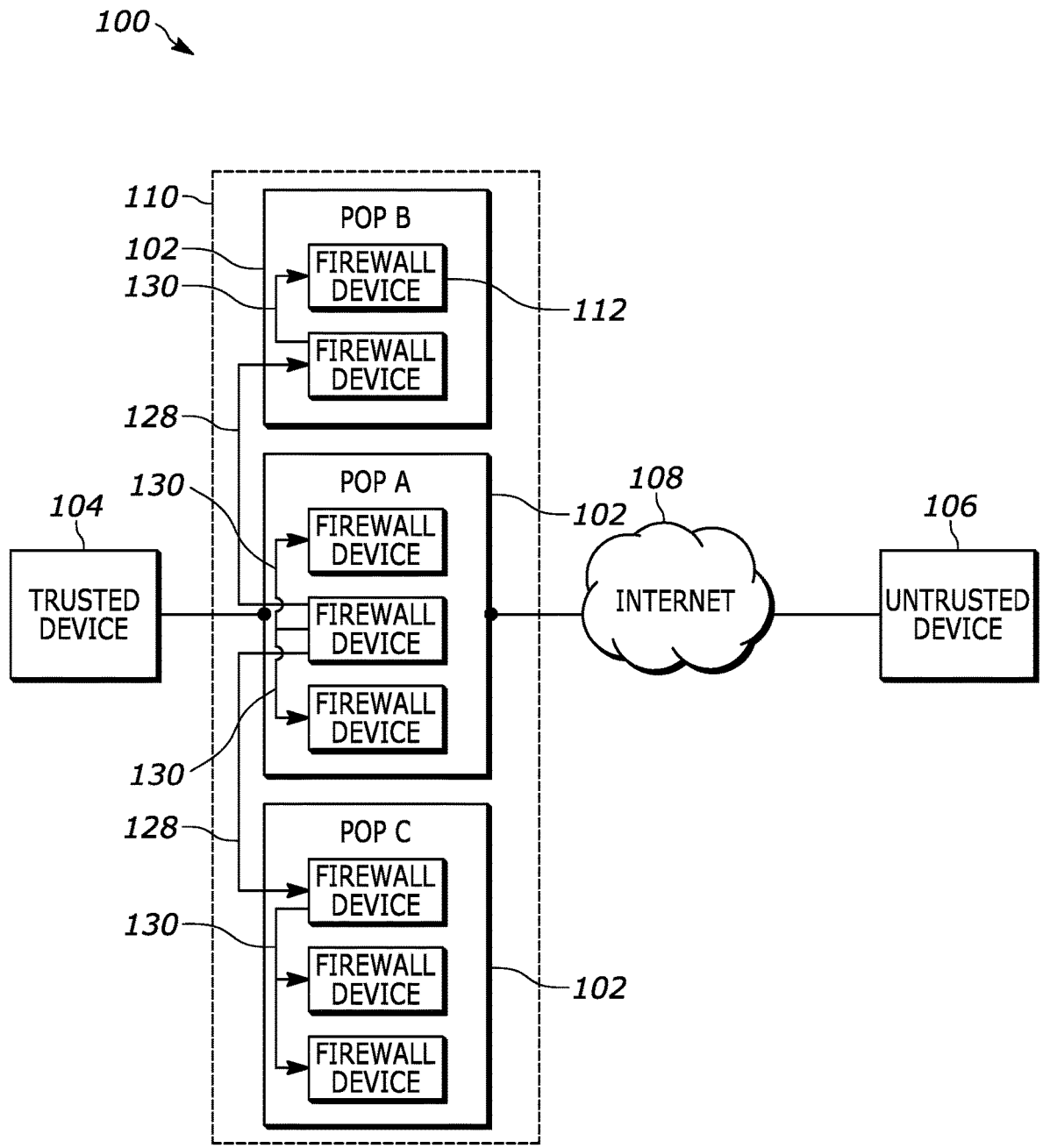
FIG. 4 illustrates the distribution of state update packets from a first firewall device to multiple other firewall devices within the PoPs of the managed system.

FIG. 4 illustrates (via arrows 128 and 130) the distribution of state update packets from a first firewall device 112 to multiple other firewall devices within the PoPs 102 of the managed system 110. In an embodiment, some state update packets, referred to herein as "inter-site" state update packets (arrows 128), are sent specifically to other PoPs in the managed system, and some state update packets, referred to herein as "local" state update packets (arrows 130), are sent locally, e.g., broadcasted from one firewall device to other firewall devices in the same PoP. As is described below, the speed with which synchronization operations can be performed is important to allow legitimate traffic to pass through the firewall devices while effectively mitigating DDoS attacks across multiple firewall devices distributed across multiple geographically distributed PoPs. In an embodiment, the state of each firewall device is constantly changing as new entries are added to the respective allowlists and as old entries are removed (e.g., "aged out") from the respective allowlists. Thus, at any moment in time, the state of all of the firewall devices, e.g., the state of the allowlists, may not be exactly the same across all of the firewall devices in the managed system 110 as state synchronization operations occur throughout the firewall devices of the managed system. State synchronization operations involving inter-site state update packets and state synchronization operations involving local state update packets are described in more detail below with reference to FIGS. 10-19.

Figure 5:
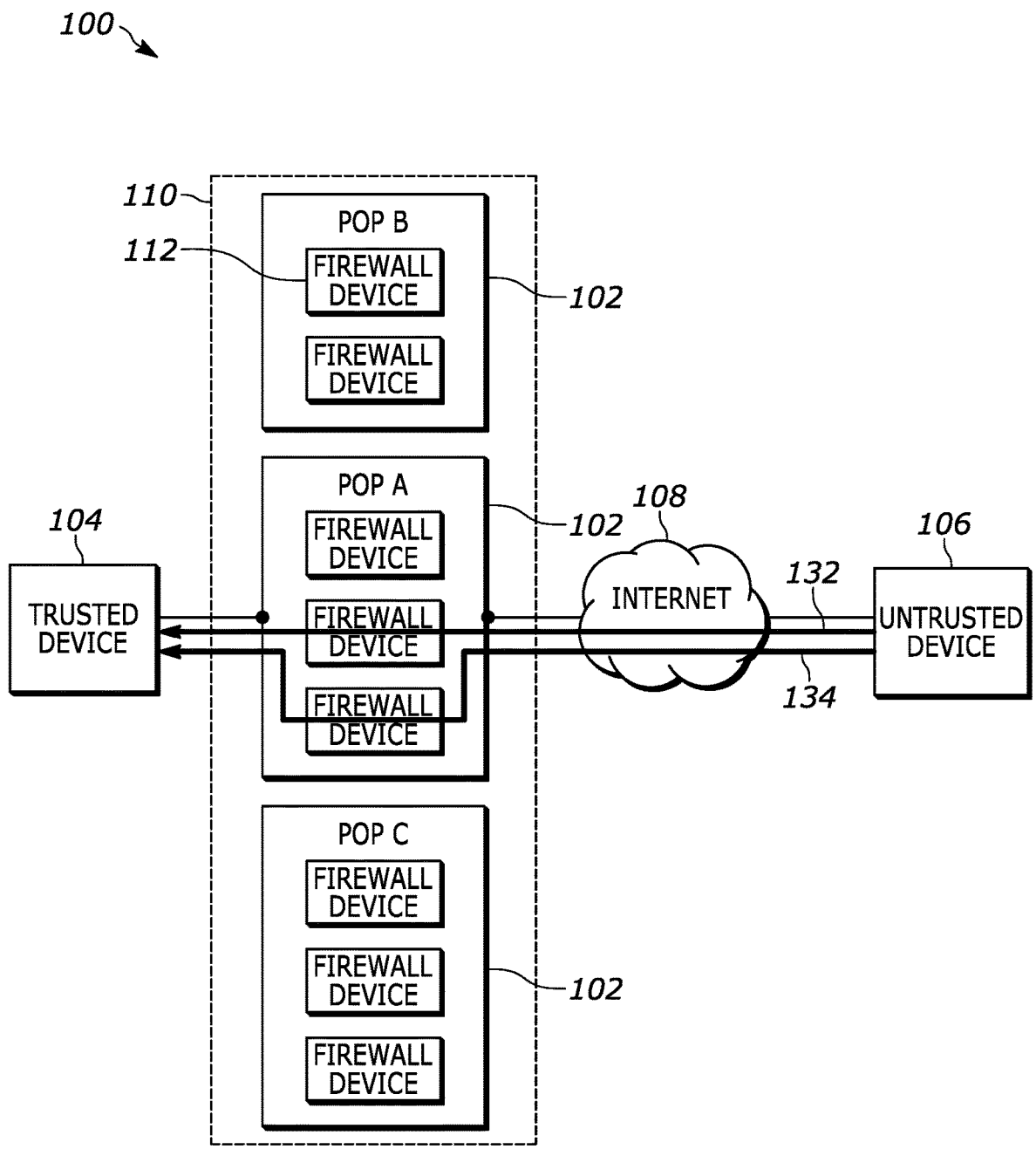
FIG. 5 illustrates that packets from an untrusted device are passed through different firewall devices of a PoP because the state of all of the firewall devices has been synchronized based on the identification of a soliciting packet.
Figure 6:
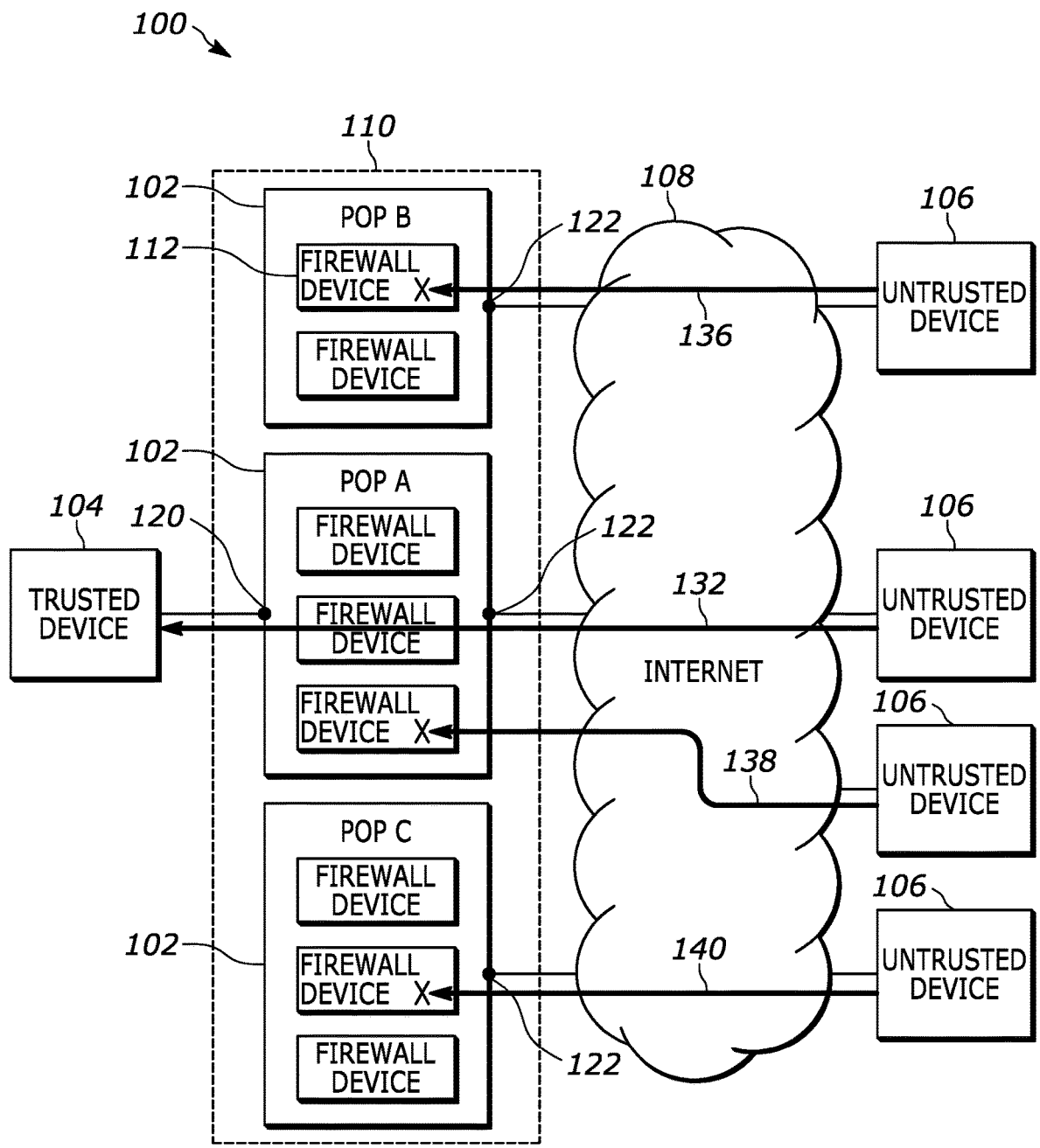
FIG. 6 illustrates traffic from at least one untrusted device passing through a firewall device as described with reference to FIG. 5 while traffic from other untrusted devices are blocked by the respective firewall devices in the managed system of firewall devices.

As state update information is distributed amongst the firewall devices in a managed system, the allowlists of the firewall device are dynamically converging to a common state, e.g., in which all of the allowlists are populated with the same entries. Packets incoming to any of the firewall devices within the managed system that correspond to entries on the allowlists of the firewall devices are allowed to pass through the different firewall devices. FIG. 5 illustrates (via arrows 132 and 134) that packets from the untrusted device 106 are passed through different firewall devices 112 of a PoP 102 because the state of all of the firewall devices has been synchronized based on the identification of the soliciting packet as described with reference to FIG. 3. Although not shown in FIG. 5, other packets that correspond to the same entry in the allowlist that present at other PoPs in the managed system (e.g., as a result of anycasting) will likewise be passed through the corresponding firewall device. In contrast, packets that do not have a corresponding entry in the allowlists of the firewall devices, including packets that are part of a DDoS attack, will not be passed through the firewall devices. FIG. 6 illustrates (via arrow 132) traffic from at least one untrusted device passing through a firewall device as described with reference to FIG. 5 while traffic (via arrows 136, 138, and 140) from other untrusted devices, which do not correspond to an entry on the corresponding allowlists and may be part of a DDoS attack, are blocked by the respective firewall devices in the managed system of firewall devices.

As described with reference to FIGS. 1-6, DDoS attacks can be mitigated by blocking most traffic incoming on untrusted interfaces 122 of the firewall devices 112 and populating allowlists of the multiple firewall devices based on identifying soliciting packets that are received at trusted interfaces 120 of the firewall devices. Thus, the identification of soliciting packets is important to timely implementation of state synchronization operations needed to achieve effective DDoS attack mitigation. Some examples of techniques for identifying soliciting packets are now described with reference to FIGS. 7A-9B.

Figure 7A:
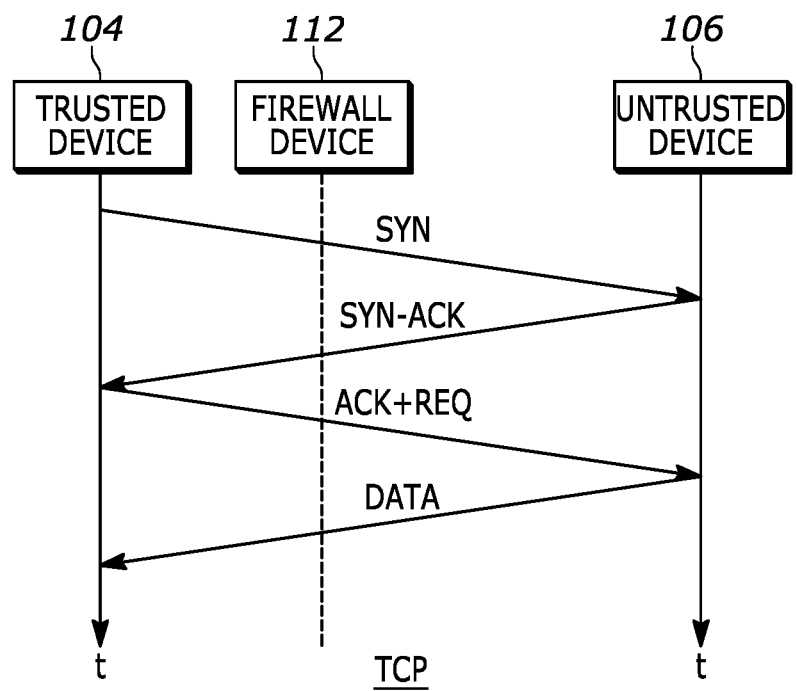
FIG. 7A illustrates standard packet-based communications between a trusted device and an untrusted device according to TCP.
Figure 7B:
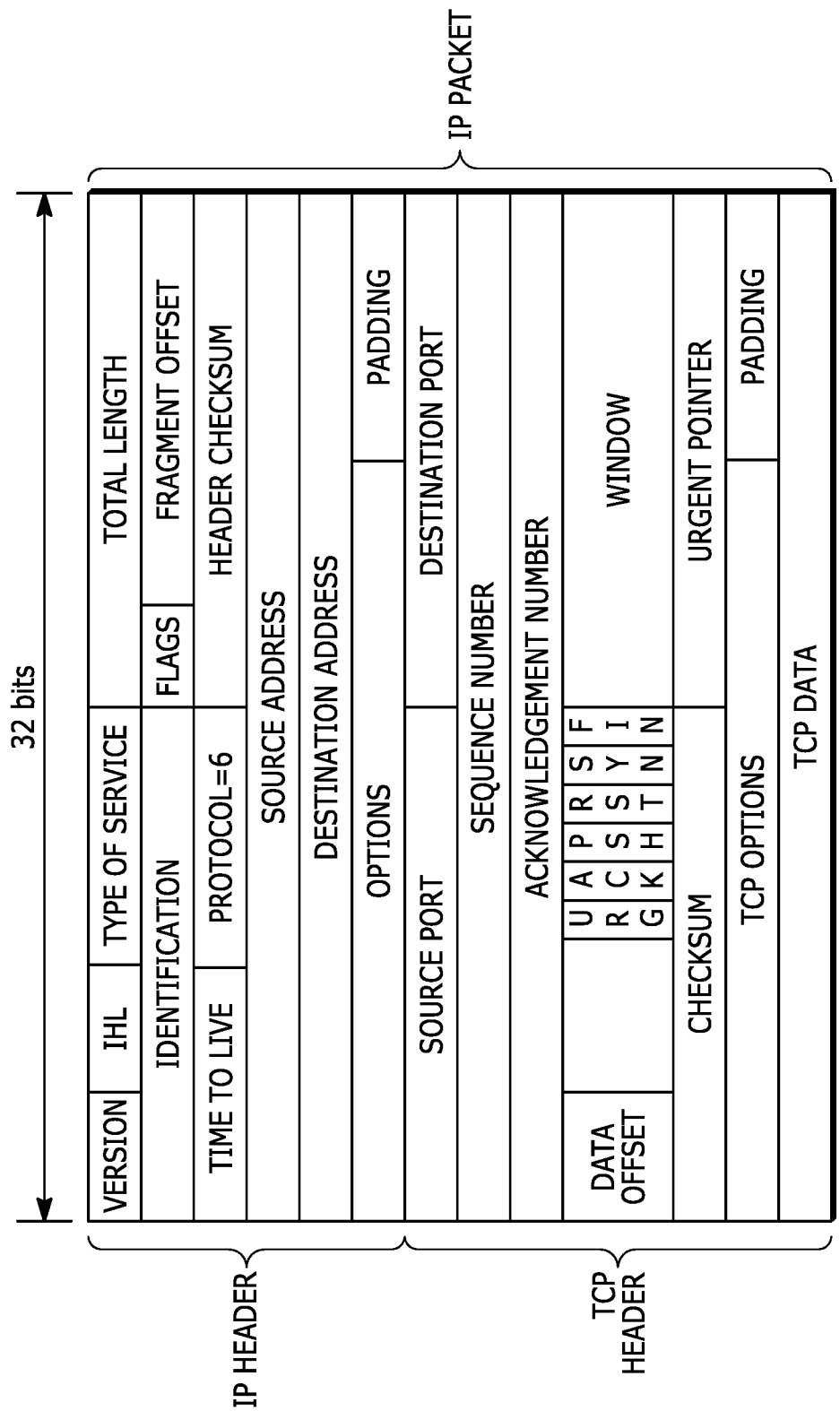
FIG. 7B depicts the frame format of a TCP/IP packet.

In one example, a soliciting packet can be identified from a TCP communication that is received at a firewall device from a trusted device, such as the trusted device described above. For example, a packet can be identified as a soliciting packet at the firewall device when a packet received on a trusted interface includes a TCP header that identifies the packet as a "SYN" packet, i.e., a packet with the "SYN" field set and the "ACK" field not set. FIG. 7A illustrates standard packet-based communications between a trusted device 104 and an untrusted device 106 according to TCP and FIG. 7B depicts the frame format of a TCP/IP packet. As shown in FIG. 7A, when the trusted device transmits a SYN packet, the trusted device is soliciting the establishment of a TCP connection and it is expected that network traffic will subsequently be sent by the untrusted device to establish and utilize the connection. For example, it is expected that a SYN_ACK packet and data packets will subsequently be sent by the untrusted device. A packet can be identified as a SYN packet by inspecting the SYN and ACK fields of the TCP header (see FIG. 7B) at a monitoring device such as the firewall devices 112 in the PoPs described above.

Figure 8A:
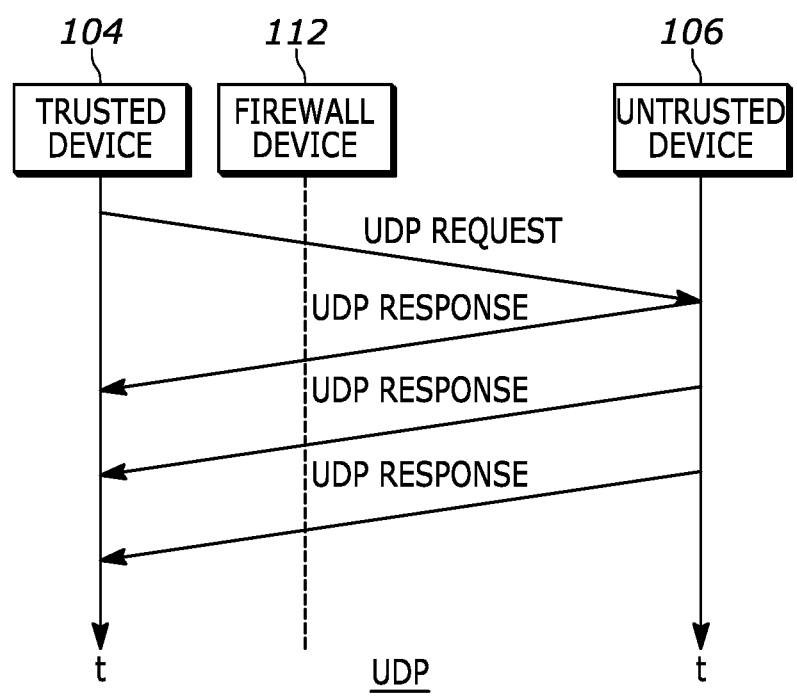
FIG. 8A illustrates standard packet-based communications between a trusted device and an untrusted device according to UDP.
Figure 8B:
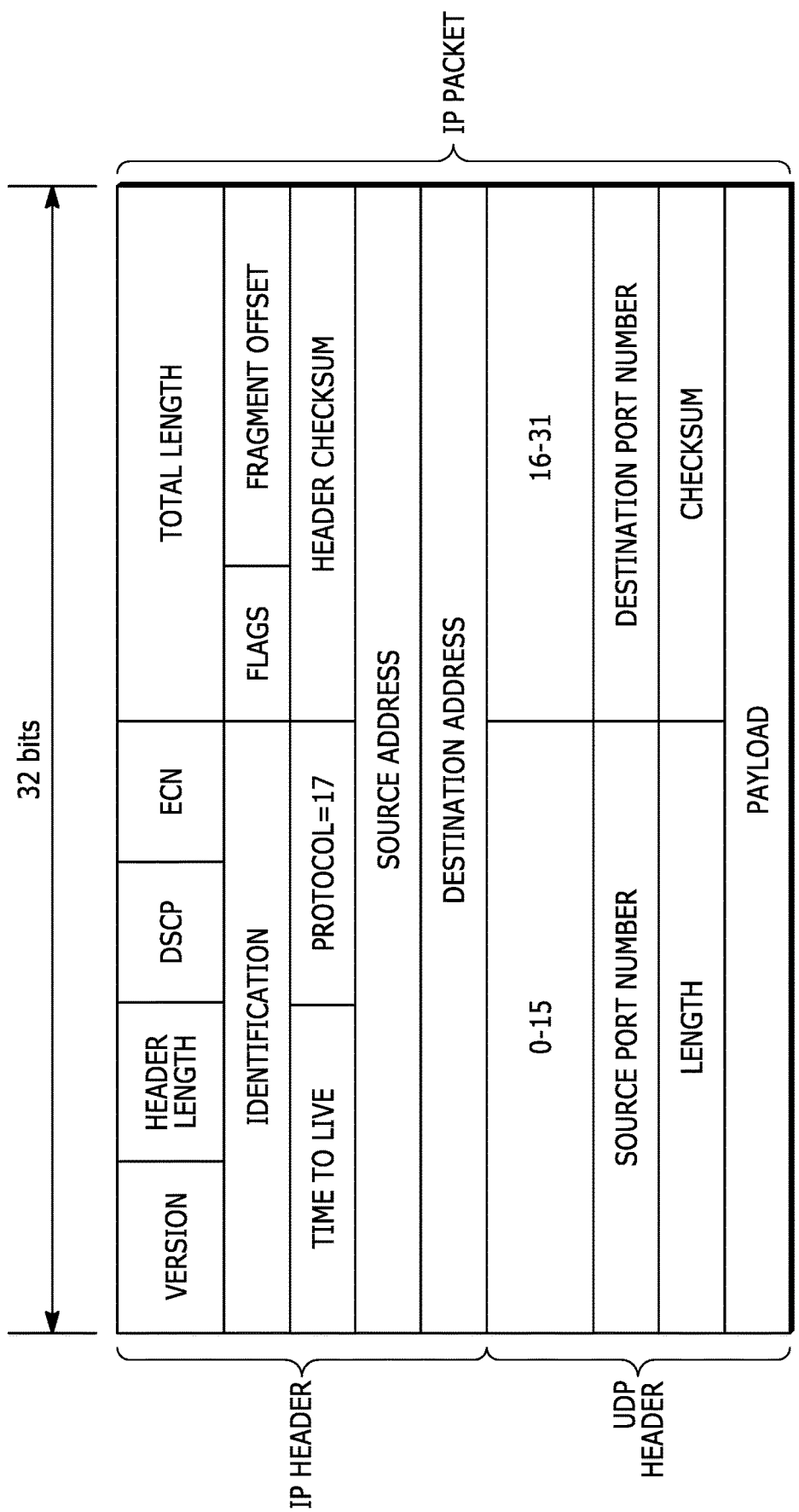
FIG. 8B depicts the frame format of a UDP/IP packet.

In another example, a soliciting packet can be identified from a UDP communication that is received at a firewall device from a trusted device, such as the trusted devices described above. In one example, a packet can be identified as a soliciting packet when the packet includes a UDP header with a destination UDP port number of less than 1,024 and a source UDP port number of greater than or equal to 32,768. In this case, only the source UDP port number falls in a range that is recognized as an ephemeral port range, which indicates that the sender is a client in a client/server connection. In another example of UDP communications, a packet can be identified as a soliciting packet when the packet includes a UDP header with a destination UDP port number that represents a well-known service, which indicates that the packet is being sent to a server in a client/server connection. Examples of well-known services that use UDP and that may indicate a soliciting packet include port 53 (DNS), port 69 (Trivial File Transfer Protocol (TFTP), port 123 (Network Time Protocol (NTP)), and port 389 (Lightweight Directory Access Protocol (LDAP)). FIG. 8A illustrates standard packet-based communications between a trusted device 104 and an untrusted device 106 according to UDP and FIG. 8B depicts the frame format of a UDP/IP packet. As shown in FIG. 8A, when the trusted device transmits a UDP request packet, it is expected that network traffic in the form of one or more UDP response packets will subsequently be sent to the trusted device from the untrusted device. A packet can be identified at the firewall device 112 as a UDP request packet by inspecting the source and/or destination port numbers in the UDP header (see FIG. 8B) of a packet received on a trusted interface.

Figure 9A:
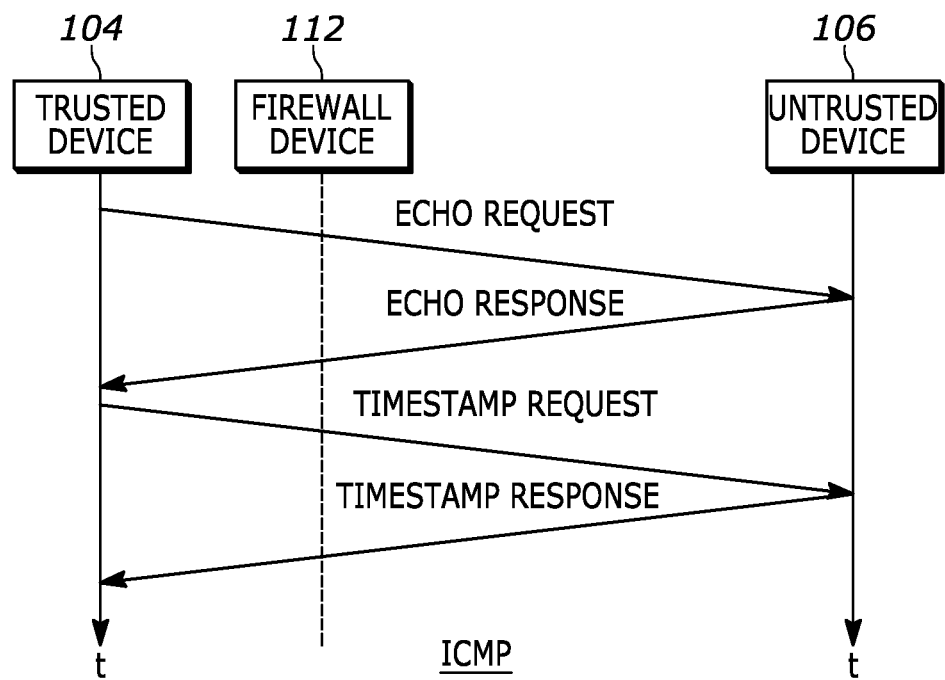
FIG. 9A illustrates standard packet-based communications between a trusted device and an untrusted device according to ICMP.
Figure 9B:
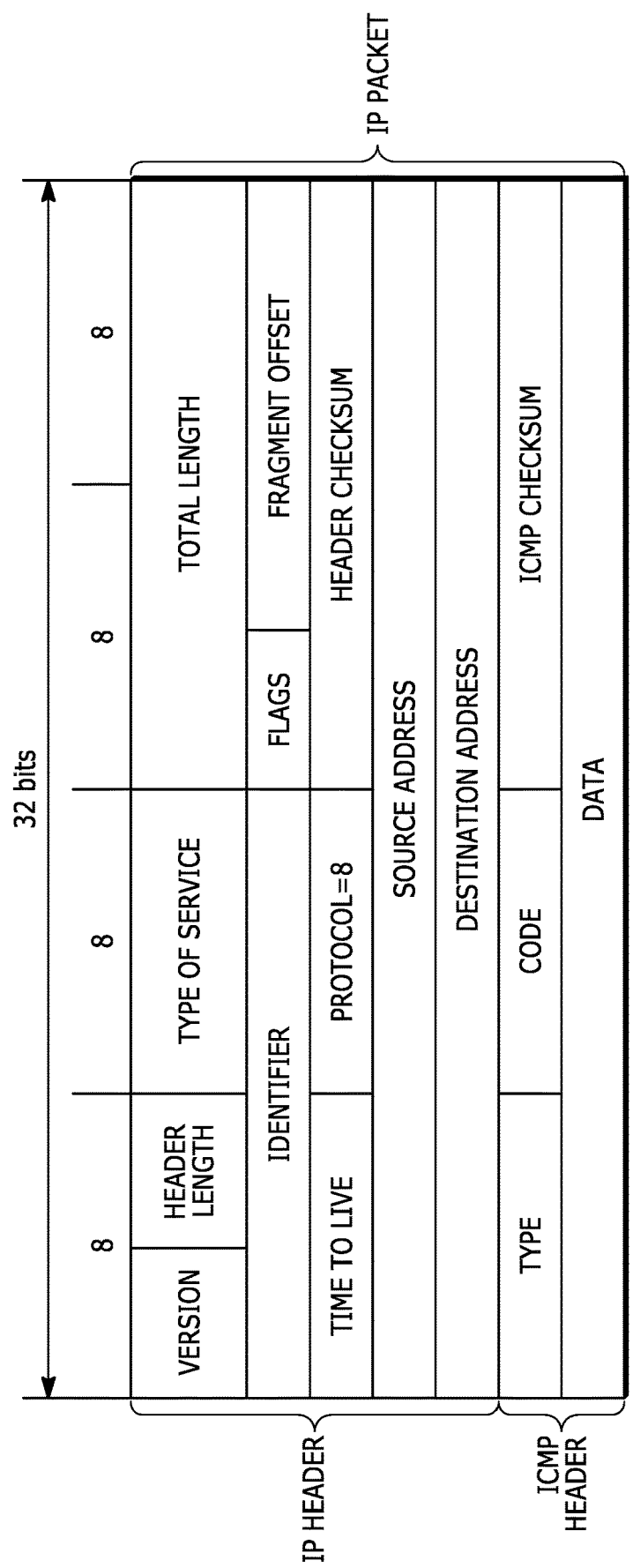
FIG. 9B depicts the frame format of an ICMP/IP packet.

In another example, a soliciting packet can be identified from an Internet Control Message Protocol (ICMP) communication that is received at a firewall device from a trusted device, such as the trusted device described above. For example, a packet can be identified as a soliciting packet when a packet received on a trusted interface includes an ICMP header type set to "echo request" or set to "timestamp request." FIG. 9A illustrates standard packet-based communications between a trusted device 104 and an untrusted device 106 according to ICMP and FIG. 9B depicts the frame format of an ICMP/IP packet. As shown in FIG. 9A, when the trusted device transmits an echo request packet or a timestamp request packet, it is expected that network traffic, e.g., an echo response or a timestamp response, will subsequently be sent by the untrusted device. A packet can be identified at the firewall device 112 as an echo request packet or a timestamp request packet by inspecting the type and code fields of the ICMP header (see FIG. 9B) of a packet received on a trusted interface.

Although some examples of soliciting packets are described, other types of packets may be classified/categorized as soliciting packets at least because the outgoing packets are expected to trigger a response from the intended target device. In an embodiment, soliciting packets are indicative of some type of connection between the trusted device and the untrusted device, for example, the connection may be related to a connection-based protocol such as TCP or the connection may be related to a "connectionless" protocol such as UDP. As is described in more detail below, early identification of an outgoing packet as a soliciting packet such as a SYN packet, a UDP packet having certain enumerated port numbers, or an ICMP packet, received at a trusted interface of a firewall device can be the trigger for state synchronization operations that rapidly synchronize state amongst multiple monitoring nodes, e.g., multiple firewall devices, in a managed system.

Figure 10:
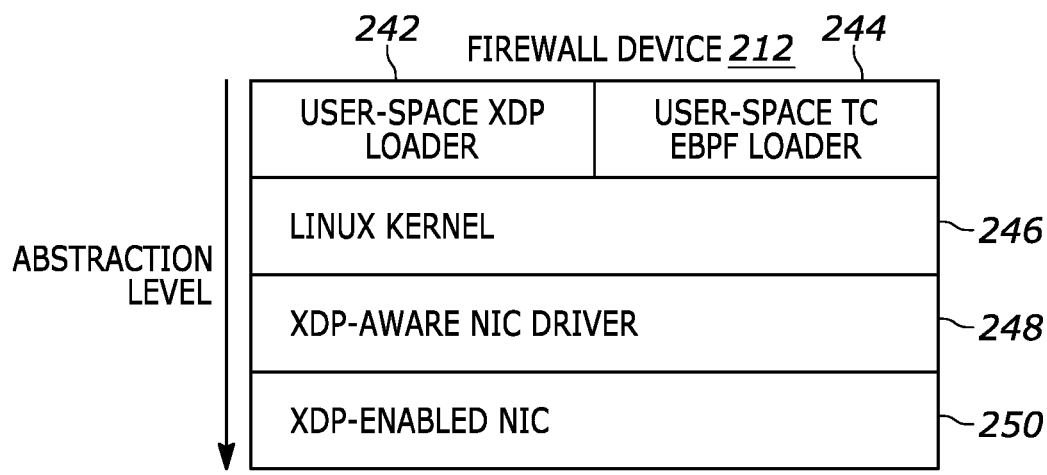
FIG. 10 graphically depicts relative abstraction levels of software components of a firewall device that is implemented on a host computer that includes an XDP-enabled NIC.

Synchronizing multiple different firewall devices in a managed system of multiple PoPs based on identifying soliciting packets is a multi-step process. When trying to mitigate DDoS attacks across such a managed system, processing time and resource utilization are important considerations. In particular, the time and resources expended to identify soliciting packets, the time and resources expended to update allowlists, and the time and resources expended to synchronize the state amongst all of the firewall devices in the managed system all have an effect on the ultimate performance of DDoS attack mitigation. Techniques for implementing state synchronization operations at very low levels in multiple monitoring nodes (e.g., in the kernel-space below the TCP/IP stack and/or in the NIC of multiple firewall devices), is now described with reference to FIGS. 10-19. To better understand features of the disclosed technique, a brief description of abstraction levels of an example monitoring node, referred to herein as a firewall device, is described with reference to FIG. 10. In particular, FIG. 10 graphically depicts the relative abstraction levels of software components of a firewall device 212 that is implemented on a host computer that includes an XDP-enabled NIC. As shown in FIG. 10, in descending order of relative abstraction level, the firewall device includes a user-space XDP loader 242 and a user-space traffic control (TC) eBPF loader 244 at a first abstraction level, a Linux kernel 246 at a second abstraction level, an XDP-aware NIC driver 248 at a third abstraction level, and the XDP-enabled NIC 250 at a fourth abstraction level. In an embodiment, the user-space XDP loader is a user-space software component that loads XDP programs into the Linux kernel and the user-space Traffic Control (TC) eBPF loader is a user-space software component that loads eBPF code into the Linux kernel. The Linux kernel is a well-known open source operating system kernel.

In an embodiment, the XDP-aware NIC driver is a NIC driver that is compatible with XDP infrastructure. An XDP-aware NIC driver enables XDP to plug into the eBPF components through an Rx buffer hook implemented in the NIC driver. In an embodiment, the XDP-enabled NIC is a NIC whose resources (e.g., Rx and Tx buffers) can be accessed via XDP.

Figure 11:
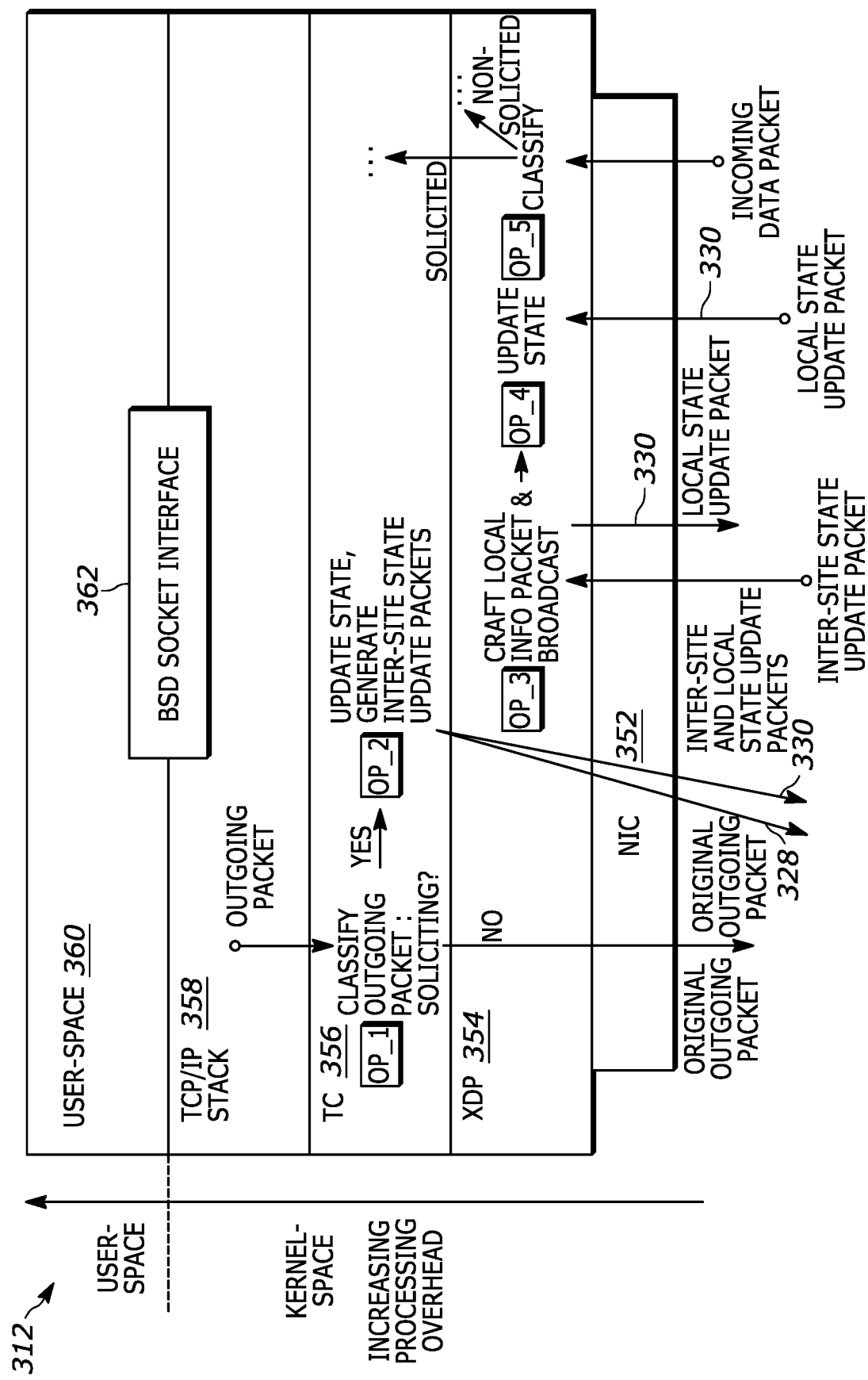
FIG. 11 illustrates state synchronization operations that are performed by a firewall device such as a firewall device with an XDP-enabled NIC as described with reference to FIG. 10.

FIG. 11 illustrates state synchronization operations that are performed by a firewall device 312 such as the firewall device 212 with an XDP-enabled NIC as described with reference to FIG. 10, relative to different levels of software components that operate at different layers within the software stack of the firewall device. As shown in FIG. 11, the layers of the software stack executed on the host computer include, in order of increasing processing overhead, a NIC layer 352 (e.g., the NIC driver software), an XDP layer 354, a Traffic Control (TC) layer 356, a TCP/IP stack layer 358, and a user-space layer 360. In an embodiment, the NIC layer represents an XDP-enabled NIC and/or its corresponding XDP-aware NIC driver software. As illustrated in FIG. 11, the TC layer and XDP layer are considered to be below the TCP/IP stack layer in that the TC layer and the XDP layer execute operations at lower abstractions levels and with lower processing overhead relative to the hardware elements (e.g., the processors and NICs) than operations that are executed in the TCP/IP layer. In an embodiment, the NIC may be a "SmartNIC" that includes a programmable SoC multi-core processor that runs Linux. For example, the SmartNIC runs Linux separate from a host computing system such as a server to which the SmartNIC is connected.

As is known in the field, eBPF is a bytecode used among other things to augment, monitor, and/or modify Linux kernel runtime behavior. The Linux kernel includes a virtual machine that interprets, processes, and executes eBPF bytecode. eXpress Data Path (XDP) is a high performance data path in the Linux kernel that runs user-supplied eBPF bytecode for low-overhead network packet inspection and manipulation. As used herein, eBPF programs intended to run on the XDP are referred to as "XDP programs." In an embodiment, the XDP is a Linux kernel component that is configured to improve packet processing performance. XDP implements programmable packet processing in the Linux kernel (i.e., the kernel-space or kernel-level) while retaining the fundamental building blocks of the Linux networking stack. XDP is an extension of eBPF capabilities in that XDP utilizes a programming model built around maps, supervised helper functions, and sandboxed bytecode that is checked and loaded into the Linux kernel in a safe fashion. An important aspect of executing XDP programs is that the eBPF bytecode is attached at the earliest possible point in the software stack, e.g., right after the packet hits the Rx buffer of the NIC and below the TCP/IP stack (e.g., in terms of increasing processing overhead). XDP provides the ability to process packets at the lowest level in the software stack. Functions implemented in network drivers expose a common API for fast packet processing across hardware from different vendors. Through driver hooks, user-defined eBPF programs (referred to herein as "XDP programs") can access and modify packets in the Direct Memory Access (DMA) buffers of a NIC's driver. This can result in a stateless and fast programmable network data path in the Linux kernel. In an embodiment, XDP has infrastructure to offload an XDP program to the NIC. Thus, in some embodiments, operations implemented via an XDP program can be offloaded to the NIC instead of being implemented by a host computer.

The TC 356 is the Linux Traffic Control (TC) subsystem. For example, Traffic Control or simply "TC" is the name given to a set of queuing systems and mechanisms by which packets are received and transmitted on a network device. Operations implemented in the kernel-space via TC include deciding which (and whether) packets to accept at what rate on the input of an interface and determining which packets to transmit in what order and at what rate on the output of an interface.

The TCP/IP stack 358 (also referred to as the TCP/IP stack layer) is a component of the Linux operating system that executes the Internet Protocol Suite of networking protocols (e.g., including the TCP/IP networking protocols) in the kernel-space. The user-space 360 refers to code that runs outside the operating system kernel. The BSD socket interface 362 is an application programming interface (API) that provides an interface between the kernel-space of the Linux operating system and the user-space. The TCP/IP stack in Linux, the user-space, and the BSD socket interface are all well-known components of computing devices that utilize the Linux operating system.

In an embodiment, the NIC 352 is connected to a host computer that includes at least one processor and the XDP 354, the TC 356, the TCP/IP stack 358, and the user-space 360 are executed by the processor of the host computer. In other embodiments, the XDP, the TC, the TCP/IP stack, and/or the user-space may be executed on a processor that is included on the NIC.

State synchronization operations are now described in a sequence of operations identified in FIG. 11 as operations, op_1, op_2, op_3, and op_4. In FIG. 11, the operations are located within a layer in which the computer readable instructions are executed to implement the operations. In an embodiment, the operations associated with operations, op_1 and op_2, are implemented through eBPF bytecode executing in the kernel-space and operations, op_3 and op_4, are implemented through XDP programs or offloaded to a NIC.

In operation op_1, a packet that is received at the TC 356 from a trusted interface (e.g., an "outgoing" packet that being transmitted from the firewall device out to an untrusted device via the Internet), is inspected in the kernel-space of the firewall device 312 to see if the packet is a soliciting packet. For example, outgoing packets are inspected in the kernel-space of the firewall device by evaluating the header information to determine if a packet should be classified/categorized as a soliciting packet. Examples of packets that can be classified/categorized as soliciting packets were described above with reference to FIGS. 7A-9B. As illustrated in FIG. 11, the inspection of an outgoing packet is executed by the TC in the kernel-space of the firewall device. In an embodiment, the functionality of operation, op_1, is implemented through eBPF code executed in the kernel-space. While the TC executes in the kernel-space, the TC is below the TCP/IP stack 358 (e.g., with respect to the level of processing overhead) and thus involves less processing overhead than processing in the TCP/IP stack or in the user-space 360. It is noted that state synchronization amongst firewall devices is conventionally implemented through user-space applications of firewall devices and connection tracking is conventionally implemented through code in the TCP/IP stack of firewall devices, both of which involve increased processing overhead compared to the TC (which executes lower in the kernel-space) and the XDP 354 (which executes even lower in the kernel-space or is offloaded to a NIC) of the firewall device.

If it is determined in operation, op_1, that an outgoing packet is not a soliciting packet (or the packet is not eligible for protection from the firewall device, e.g., based on the source IP address), then the outgoing packet is passed down to the NIC 352 and transmitted out from the firewall device 312 to the packet's destination. An outgoing packet that is not classified as a soliciting packet is said to travel on a "fast path" through the firewall device.

If it is determined in operation, op_1, that an outgoing packet is a soliciting packet, then the packet is subjected to a next operation, op_2. In operation, op_2, which is also implemented by the TC 356 through the execution of eBPF code in the kernel-space of the firewall device 312, the state of the firewall device is updated and state update packets (e.g., inter-site state update packets 328 and local state update packets 330) are generated for transmission from the firewall device. In an embodiment, updating the state of the firewall device involves updating an allowlist, which identifies incoming packets that are allowed to pass through the firewall device when received on an untrusted interface of the firewall device. In an embodiment, the allowlist is maintained in the kernel-space of the firewall device as a map using eBPF, in particular, a least recently used (LRU) key-value map. FIG. 12A depicts an example of a map 364, referred to herein as the "HOLE_MAP," in which keys are mapped to corresponding values. FIG. 12B depicts an example of a key 366 from the HOLE_MAP and FIG. 12C depicts an example of a value 368 from the HOLE_MAP. In the example of FIG. 12B, the HOLE_MAP key includes fields for a protected host IP address, a remote host IP address, a remote host L4 port, a protected host L4 port, an IP version, an L4 protocol, and padding, and the HOLE_MAP value (FIG. 12C) includes a 32-bit field for data such as a timestamp. In an embodiment, the L4 protocol field and the L4 source and destination port number fields can be set to "0" if the L4 protocol does not support port numbers (e.g., Generic Route Encapsulation (GRE)). Use of the keys and values of the map, HOLE_MAP, is described below. Although an example of a map, e.g., HOLE_MAP, is described with reference to FIGS. 12A-12C, other examples of a map are possible. In one embodiment, the map may include multiple maps in which some of the maps are cached to improve performance.

Returning back to operation, op_2, as shown in FIG. 11, in an embodiment, updating the state of the firewall device 312 involves updating a locally maintained map, HOLE_MAP, which may involve 1) adding a new entry to the map if a matching entry does not already exist in the map, and 2) updating the timestamp of an entry in the map when an entry already exists in the map.

In an embodiment, the state update operations associated with operation, op_2, may be bypassed if the outgoing packet already has a corresponding entry in the HOLE_MAP and the entry was recently updated such that the entry's timestamp is less than a designated time delta, e.g., less than REFRESH_TIME, from the current time, such as 100 milliseconds. Such an approach of limiting the frequency of timestamp updates can reduce the number of updates of the same map entry across the entire managed system, thereby conserving processing resources across the managed system.

Figure 13:
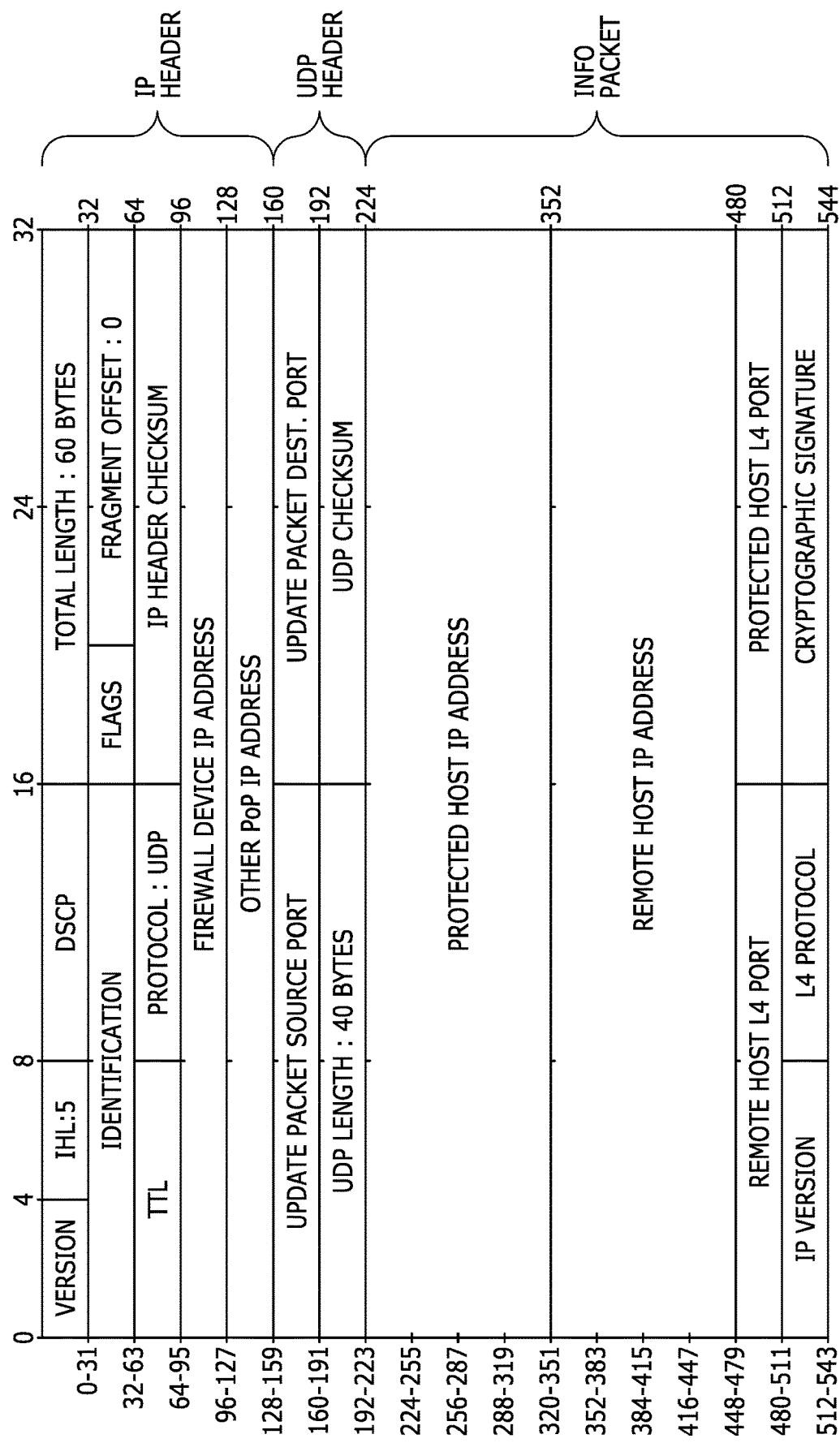
FIG. 13 depicts an example of an inter-site state update packet that is generated by a TC in the kernel-space.

In addition to updating the state of the firewall device 312, in operation, op_2, the firewall device generates local state update packets 330 for transmission to other firewall devices in the same PoP and generates inter-site state update packets for transmission to the other PoPs in the managed system. FIG. 13 depicts an example of an inter-site state update packet that is generated by the TC in the kernel-space. As shown in FIG. 13, the inter-site state update packet includes a UDP/IP header that includes a source IP address of the firewall device, a destination IP address of an intended PoP ("Other PoP IP address"), a UDP source port of the state update packet, a UDP destination port of the state update packet, a UDP length, a UDP checksum, and payload that includes a protected host IP address, a remote host IP address, a remote host L4 port, a protected host L4 port, an IP version, an L4 protocol, and a cryptographic signature.

As shown in FIG. 13, the destination IP address in the IP header is set to the IP address of another PoP in the managed system. Sending update packets to other PoPs in the managed system ensures that the state is synchronized amongst the PoPs in a time efficient manner In operation, op_2, state update packets may also be distributed locally, e.g., to other firewall devices within the same PoP. In an embodiment, the distinction between an inter-site state update packet and a local state update packet can be encoded in, for example, a UDP/IP field of the packet header such as in the UDP checksum field, or, for example, an additional bit, e.g., a PKT_BCAST bit, set in the payload of the state update packet. Local distribution may be accomplished by broadcasting the state update packet on the local network of the PoP.

Although an example state update packet is described with reference to FIG. 13, the state update packets used to distribute state information between Internet PoPs, and also for local broadcast, can be constructed in a variety of ways, including but not limited to: using IPv4 or IPv6 protocol for the outer layer; using various IP addressing schemes to influence how the packets are routed to other PoPs; using UDP, TCP or another, possibly custom protocol, as an inner layer protocol for an IP packet payload; and/or routing packets between PoPs without employing Internet Protocol at all. In an embodiment, the inter-site state update packets used to distribute state information between PoPs and the local state update packets used for local broadcast do not have to have a similar structure, e.g., for local broadcast the information can be embedded directly in an Ethernet frame without employing the Internet Protocol. In an embodiment, the program that is classifying a packet as a soliciting packet can employ IP multicasting (multicast) with properly set up inter-site multicast routing to send out a single generated inter-site state update packet instead of sending multiple different inter-site state update packets to different PoPs, each with a PoP-specific destination IP address. Employing IP multicasting can also remove the need for broadcasting an additional local state update packet. Both inter-site and local state update packets can employ integrity protection and replay protection mechanisms, e.g., by employing a keyed hash with a secret key (e.g., a cryptographic signature), and including a timestamp as part of the state update packet. The contents of state update packets can be buffered for a short time before distribution, so that state update information for multiple different map entries can be "batched" into a single packet, which can cut down the communication overhead.

The program evaluating incoming packets (e.g., implementing operation, op_1) can extend special treatment to certain protocols like ICMP or ICMPv6, marking such packets as "hole punched" if an entry in the HOLE_MAP exists for the source and destination IP addresses, regardless of layer 4 protocol or port numbers of the entry.

In an embodiment, rate limiting can be employed to limit the frequency of new holes being opened. For example, the maps (e.g., HOLE_MAP) will have a finite amount of available memory and some limitations may be put on the number of entries that correspond to a particular entity. For example, the number of map entries corresponding to a particular source IP address may be limited to a certain number of additions per unit of time or there may be an absolute limit on the number of entries per entity. Such limiting can prevent an entity from consuming all of the map resources, e.g., memory resources for storing the map.

Although in the example of FIG. 11, multiple state update packets (e.g., including inter-site state update packets and/or local state update packets) are generated in operation, op_2, it is possible that only one state update packet is needed, although in typical hyperscale applications, multiple state update packets are needed to synchronize all devices in a managed system. Additionally, in operation, op_2, the original outgoing packet is transmitted from the firewall device to its designated destination. A packet that is classified as soliciting, and thus subjected to the operation, op_2, is said to travel on a "slow path" through the firewall device. However, a soliciting packet may travel on the fast path if an entry is already in an allowlist and the entry was recently updated.

As described with reference to FIG. 11, an outgoing packet, e.g., a packet received on a trusted interface or locally generated is subjected to operations op_1 and op_2. State synchronization operations, op_3 and op_4, involve incoming packets received at the firewall device 312, e.g., through the XDP-enabled NIC of the firewall device, on an untrusted interface that is connected to an unprotected domain such as the Internet. Packets received at the firewall device on an untrusted interface are inspected by an eBPF program attached to a network interface on XDP. An XDP program may be executed in the kernel-space of a host computer of the firewall device or the XDP program may be offloaded to a NIC of the firewall device. XDP programs are able to make decisions, rewrite packets, and/or change some aspect of packets before resource intensive processing occurs in the Linux kernel.

At operation, op_3, an incoming packet is inspected by the XDP program to see if the packet is a state update packet. When the XDP program determines that the packet is an inter-site state update packet, e.g., because the bit, PKT_BCAST, is not set, at operation, op_3, the XDP program rewrites the packet and broadcasts a local state update packet on the local network within the PoP, e.g., with the packet broadcast bit, PKT_BCAST, set to indicate to other firewall devices that the state update packet is a local state update packet. Before an inter-site state update packet is rewritten, or when the XDP program determines that the packet is a local state update packet, e.g., because the broadcast bit, PKT_BCAST, is set, the state update packet is subjected to operation op_4. At operation, op_4, the state of the firewall device is updated in response to the state update packet, whether the state update packet is an inter-site state update packet or a local state update packet. For example, the HOLE_MAP (e.g., the allowlist) is updated either by 1) adding a new entry to the map if a matching entry does not already exist in the map, or by 2) updating the timestamp of an entry when an entry already exists in the map. In the example described with reference to FIG. 11, the XDP program is implemented via eBPF bytecode that executes in the kernel-space of the firewall device or via XDP offload to the NIC of the firewall device. Because operations, op_3 and op_4, execute at such a low level in the firewall device (e.g., below the TCP/IP stack), the synchronization operations of generation and distribution of state update packets and map updates (synchronization operations, op_3 and op_4) can execute at or near the line rate of the XDP-enabled NIC of the firewall device with less processing overhead than conventional state synchronization operations.

Although not part of the state synchronization operations, operation op_5, involves the filtering of incoming packets (e.g., identified as "data packets") by the XDP program to mitigate DDoS attacks. In particular, incoming packets received at an untrusted interface of the firewall device are inspected by the XDP program and compared to the allowlist, e.g., the kernel-level HOLE_MAP, to determine whether the packet should be dropped or passed up through the firewall device for further processing. For example, the XDP program generates a key from the header information of the incoming packet and compares the key to the HOLE_MAP to determine how to handle the packet.

Figure 14:
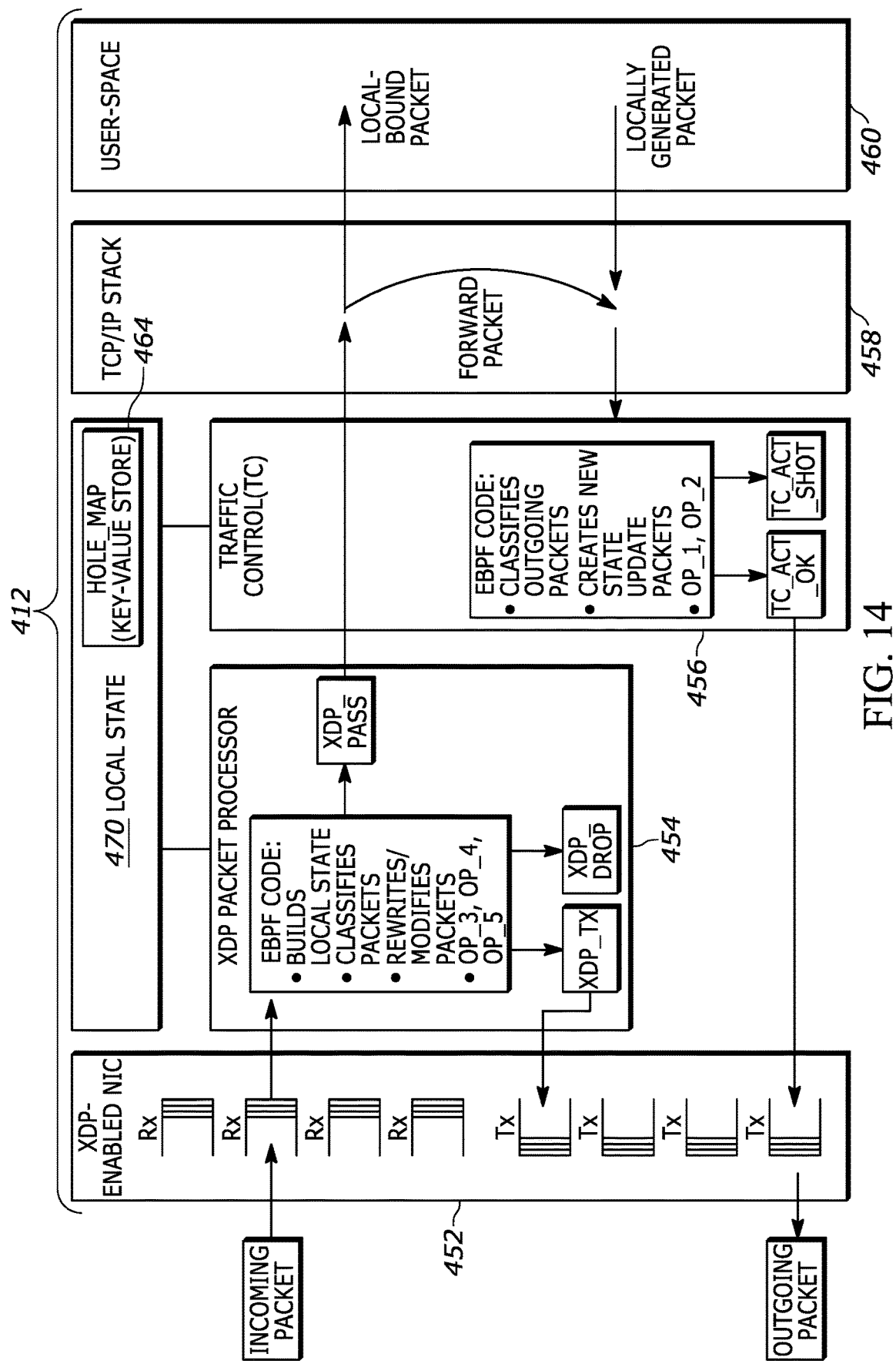
FIG. 14 illustrates a monitoring node for implementing the same state synchronization operations described with reference to FIG. 11 from a component level perspective of a firewall device that includes an XDP-enabled NIC.

Operations related to implementing state synchronization amongst multiple different monitoring nodes at the kernel-level of multiple different firewall devices were described with reference to FIG. 11 relative to different layers of a firewall device that includes an XDP-enabled NIC. FIG. 14 illustrates a monitoring node/firewall device 412 for implementing the same state synchronization operations described with reference to FIG. 11 from a component level perspective of a firewall device that includes an XDP-enabled NIC. In the embodiment of FIG. 14, components of the firewall device 412 include an XDP-enabled NIC 452, an XDP packet processor 454, a Traffic Control (TC) component 456, a local state component 470 (e.g., the HOLE_MAP 464 held in non-volatile memory), a TCP/IP stack component 458, and a user-space component 460. The components of the firewall device shown in FIG. 14 are now described relative to operations, op_1-op_5, as described with reference to FIG. 11. With regard to operations, op_1 and op_2, an outgoing packet may be forwarded from the TCP/IP stack to the Traffic Control component or from the user-space component to the Traffic Control component. In the case of a forwarded packet, the packet may be received on an Ethernet port of the firewall device from a trusted device via a trusted interface. The packet is processed by the TCP/IP stack and recognized as an outgoing packet that should be output from the firewall device on a port that faces the Internet, e.g., an untrusted interface. In the case of a locally generated packet, the packet may be generated by an application that executes on a local host computer. Alternatively, the locally generated packet may be generated by an application that executes in the user-space of a SmartNIC.

Regardless of where an outgoing packet originates, the outgoing packet is passed down to the Traffic Control (TC) component 456 from the TCP/IP stack 458. In an embodiment, the Traffic Control component includes eBPF code (e.g., an eBPF program) that executes in the kernel-space of the firewall device below the TCP/IP stack and implements operations, op_1 and op_2, as described above. For example, in operation, op_1, the eBPF code inspects the outgoing packet to see if the packet falls into the class of soliciting packet as described above. If the outgoing packet is determined not to be a soliciting packet, then the outgoing packet is passed directly to a NIC (which may or may not be the XDP-enabled NIC 452) for transmission from the firewall device, e.g., fast path processing. If the outgoing packet is determined to be a soliciting packet, then in operation, op_2, the eBPF program executing in the kernel-space implements a local state update operation and generates an inter-site state update packet. In an embodiment, the eBPF code of the Traffic Control component implements the following operations:

1) Marks the outgoing packet as "processed" and clones the packet. An eBPF program attached to a classifier (e.g., a TC queuing disciplines or "qdisc" classifier) will be called for the cloned packet, but the classifier will pass the cloned packet on to the Tx buffers of the NIC (which may or may not be an XDP-enabled NIC) as-is upon recognizing that the packet is marked as "processed";

2) Inserts an entry into the HOLE_MAP with a current timestamp;

3) Rewrites the outgoing packet as an inter-site state update packet that is intended for other PoPs in the managed system. The inter-site state update packet contains fields as described with reference to FIG. 13, which are used to create an entry in the HOLE_MAP of other firewall devices;

4) Clones the rewritten inter-site state update packet multiple times, once for each PoP in the managed system (if there are more than two PoPs in the managed system), with the destination IP address changed each time to the IP address of the intended PoP in the managed system so that the inter-site state update packet is routed to a firewall device at the PoP; and 5) Broadcasts the state update packet on the local network (e.g., with an additional bit, PKT_BCAST, set in the payload) that indicates the packet was locally broadcasted.

In an embodiment, the eBPF code in the TC uses the TC_ACT_OK command to pass the kernel socket buffer (skb) of a packet down to the NIC device driver for transmission of the packet and uses the TC_ACT_SHOT command to drop a packet.

With regard to operations, op_3, op_4, and op_5, an incoming packet is held in a receive buffer (Rx) of the XDP-enabled NIC 452 and information related to the packet is processed by an XDP program of the XDP packet processor 454. For example, in operation, op_3, incoming packets are inspected by the XDP packet processor to classify the incoming packets. For example, packets are first inspected to see if the packets are classified as state update packets. In an embodiment, the XDP packet processor includes a table of IP addresses that correspond to the IP addresses of devices within the managed system. An incoming packet with a source IP address that matches an IP address in the table can be immediately classified as a state update packet and processed as such. Other fields such as UDP header fields can be used to classify incoming packets as state update packets. If an incoming packet is determined to be a state update packet, the packet is checked to see if the packet is a local state update packet.

In one example, if a broadcast bit (e.g., a PKT_BCAST bit in the payload) is not set, then the packet is determined to be an inter-site state update packet and thus should be distributed locally to other firewall devices in the PoP. In an embodiment, when the packet is an inter-site state update packet (e.g., the broadcast bit, PKT_BCAST, is not set), the XDP packet processor 454 broadcasts the inter-site state update packet on the local network of the PoP as a local state update packet, e.g., with the broadcast bit, PKT_BCAST, set. As illustrated in FIG. 14, a local state update packet can be transmitted out of the NIC directly from the XDP packet processor via an "XDP_TX" command of the XDP packet processor. Because an XDP program runs in the kernel-space of the firewall device 412 or is offloaded to the NIC of the firewall device, the XDP program can read an Ethernet frame from the Rx buffer ring of the XDP-enabled NIC and generate the local state update packet before a socket buffer, skb, is created for the packet in the memory that has been allocated for socket buffers. In addition to generating and distributing local state update packets, the XDP packet processor updates the local state of the firewall device, e.g., implements operation, op_4. In particular, the XDP packet processor of the firewall device updates the allowlist, which may involve; 1) creating a new entry in the HOLE_MAP 464 if no matching entry exists, or 2) updating an existing entry in the HOLE_MAP, e.g., updating the timestamp of an existing entry in the HOLE_MAP.

If the incoming packet is determined to be a local state update packet (e.g., a broadcast bit, PKT_BCAST, is set), then the XDP packet processor of the firewall device updates the local state, e.g., implements operation, op_4. As with the case of an inter-site state update packet, the XDP packet processor 454 of the firewall device 412 updates the allowlist, which may involve; 1) creating a new entry in the HOLE_MAP if no matching entry exists, or 2) updating an existing entry in the HOLE_MAP, e.g., updating the timestamp of an existing entry in the HOLE_MAP.

If the incoming packet is not a state update packet, then the XDP packet processor 454 of the firewall device 412 implements operation, op_5, which involves generating a key from information in the packet header and searching the allowlist, e.g., the HOLE_MAP 464 in the local state, for a matching entry. If the key of a packet matches an entry in the HOLE_MAP, and a time delta between the timestamp and the current time is less than a pre-established increment (e.g., less than an increment stored as IDLE_TIME), the packet is passed up to higher layers in the firewall device for further network processing, e.g., using the "XDP_PASS" command and the timestamp of the entry in the HOLE_MAP is updated with the current time. If, however, the key of the packet does not match an entry in the HOLE_MAP or the entry is too old (e.g., a time delta between the timestamp and the current time exceeds IDLE_TIME), then the packet is dropped by the XDP packet processor using, for example, the "XDP_DROP" command, which instructs the driver to drop the packet. In other embodiments, instead of being dropped, a packet that does not have a matching entry in the HOLE_MAP may be further processed (e.g., including be passed up to a higher layer in the firewall device) instead of, or before, being dropped. Again, because the XDP packet processor runs at such a low level in the firewall device (e.g., in the kernel-space of the firewall device or offloaded to the NIC of the firewall device), the XDP packet processor can read header information of incoming packets from the Rx buffer ring of the XDP-enabled NIC and can drop a packet before a kernel-level socket buffer, skb, is created for the packet. Thus, the XDP packet processor is able to identify and drop potentially malicious packets before such packets even reach the TCP/IP stack 458 and/or an application executing in the user-space 460 of the firewall device.

Figure 15:
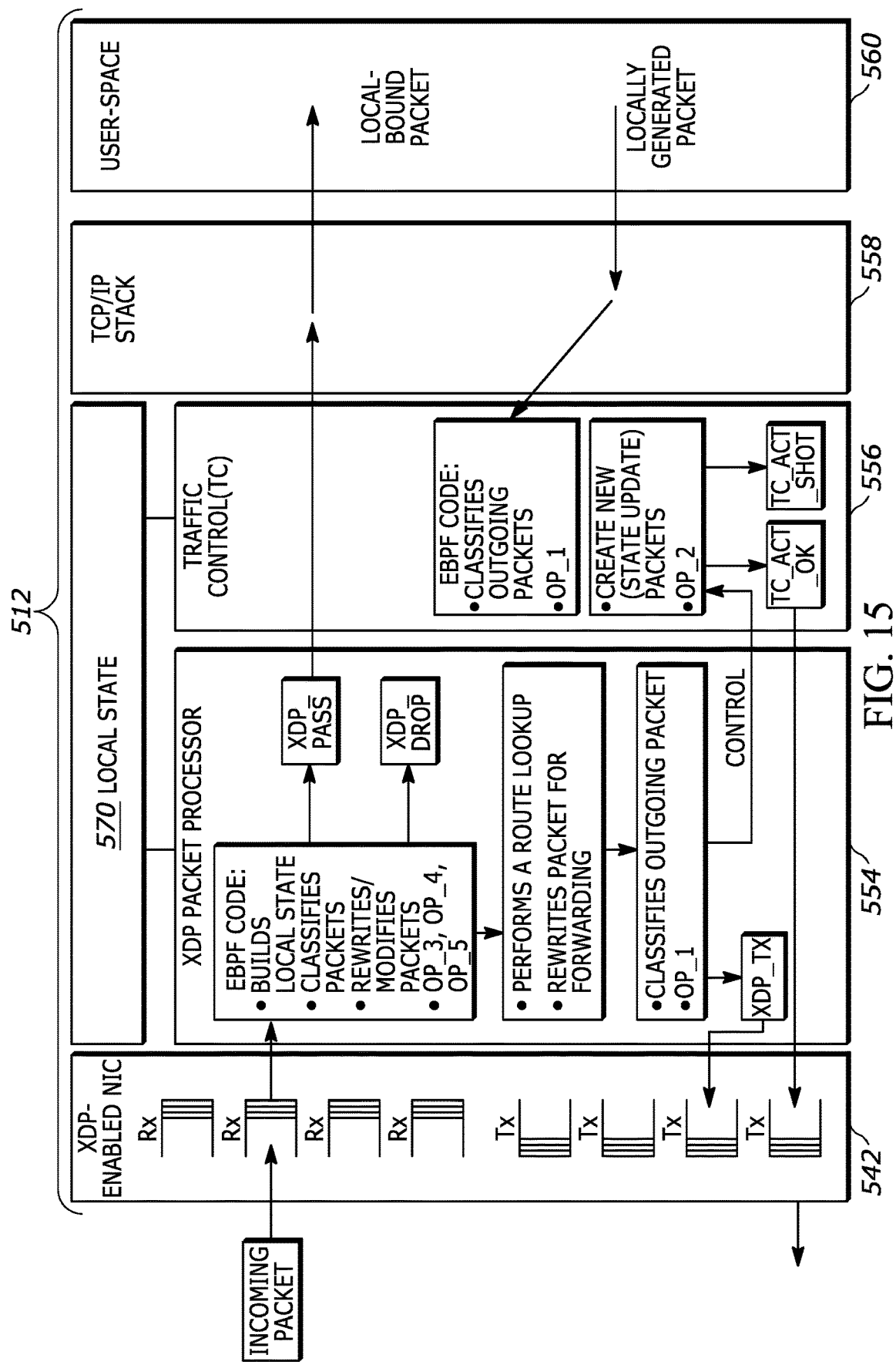
FIG. 15 illustrates a monitoring node similar to the monitoring node of FIG. 14 in which the operations performed by the XDP packet processor include forwarding and classification.

In the example described with reference to FIG. 14, some packet forwarding is implemented in the TCP/IP stack. In other embodiments, some packet processing and classification may be performed in the XDP packet processor. FIG. 15 illustrates a monitoring node/firewall device 512 similar to the monitoring node of FIG. 14 in which the operations performed by the XDP packet processor 554 include forwarding and classification. In particular, the XDP packet processor may be configured to perform route lookups, to rewrite packets for forwarding, and to classify outgoing packets (e.g., operation, op_1) as soliciting packets using criteria as described above. In an embodiment, packets identified by the XDP packet processor as not-soliciting are forwarded to a transmit buffer of the XDP-enabled NIC 542 via the XDP_TX command and packets identified by the XDP processor as soliciting packets are pushed up to the TC 556 to implement state synchronization operations such as operation, op_2.

Figure 16:
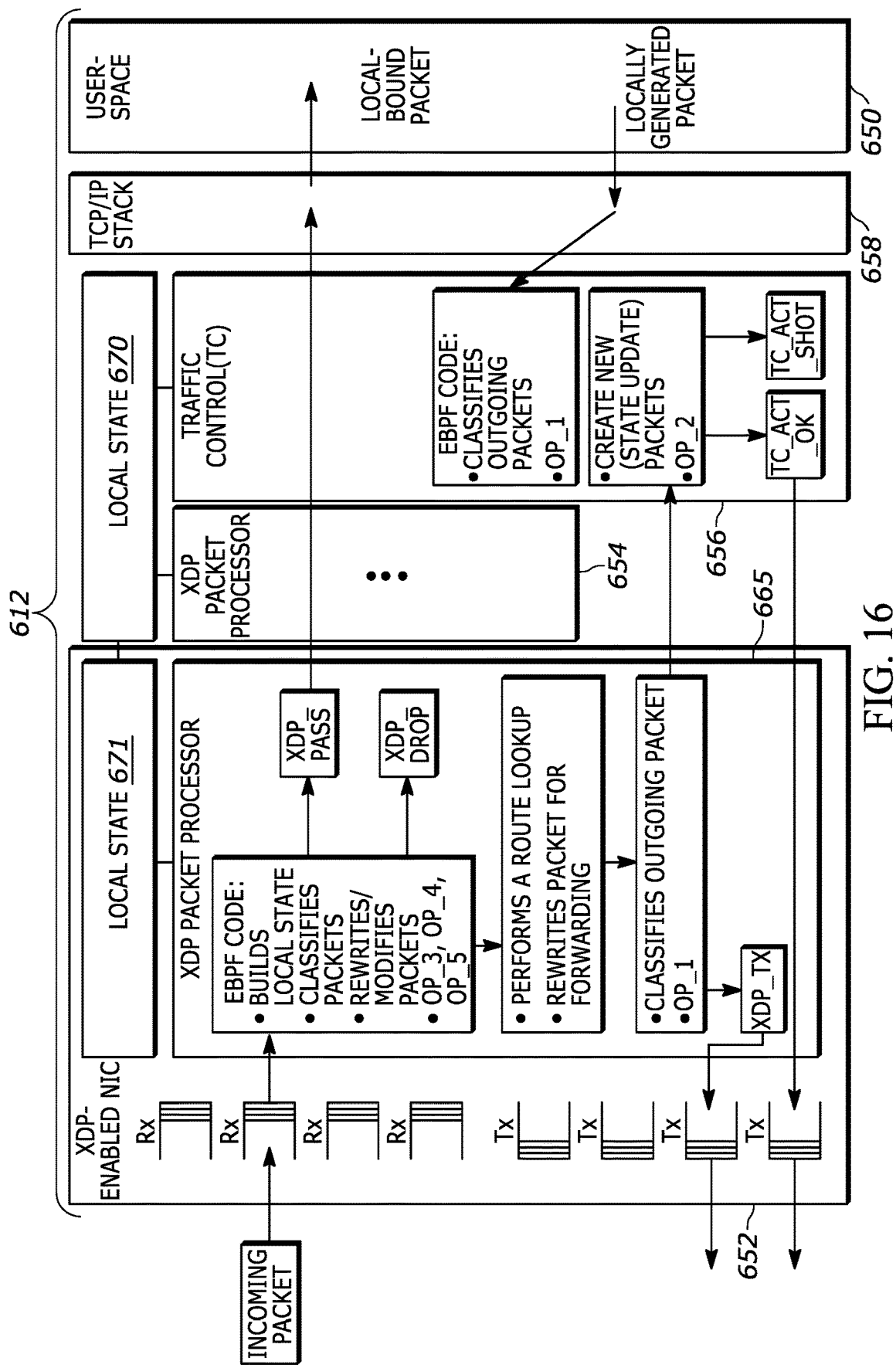
FIG. 16 illustrates a monitoring node similar to the monitoring nodes of FIGS. 14 and 15 in which operations performed by the XDP packet processor are offloaded to an XDP-enabled NIC.

In the examples described with reference to FIGS. 14 and 15, the XDP packet processor is implemented exclusively in the kernel-space of the host computer. However, in other embodiments, operations performed by the XDP packet processor may be implemented in the XDP-enabled NIC itself, sometimes referred to "offloaded" to the NIC. FIG. 16 illustrates a monitoring node/firewall device 612 similar to the monitoring nodes of FIGS. 14 and 15 in which operations performed by the XDP packet processor are offloaded to the XDP-enabled NIC. In particular, an XDP packet processor 655 in the XDP-enabled NIC 652 is configured to perform operations, op_1, op_3, op_4, and op_5 and may further be configured to perform route lookups, to rewrite packets for forwarding, and to classify outgoing packets as soliciting packets using criteria as described above. In an embodiment, the NIC may include a HOLE_MAP or some portion thereof as part of a "local state" 671. In an embodiment, packets identified by the XDP packet processor 655 as soliciting packets are pushed up to the TC 656 to implement operations such as operation, op_2. The firewall device may also include an XDP packet processor 654 executing in the kernel-space of a host computer as described with reference to FIG. 14.

In an embodiment, in operation, op_5, the XDP packet processor 655 in the XDP-enabled NIC 652 can pass a packet (e.g., mark the packet as "hole punched") if a corresponding entry exists in the HOLE_MAP for the particular source and destination IP address regardless of the L4 protocol or L4 port numbers.

In an embodiment, all of the firewall devices across a managed system implement operations, op_1-op_4, such that the state of their allowlists (e.g., the HOLE_MAPs) is constantly being shared/updated.

Figure 17:
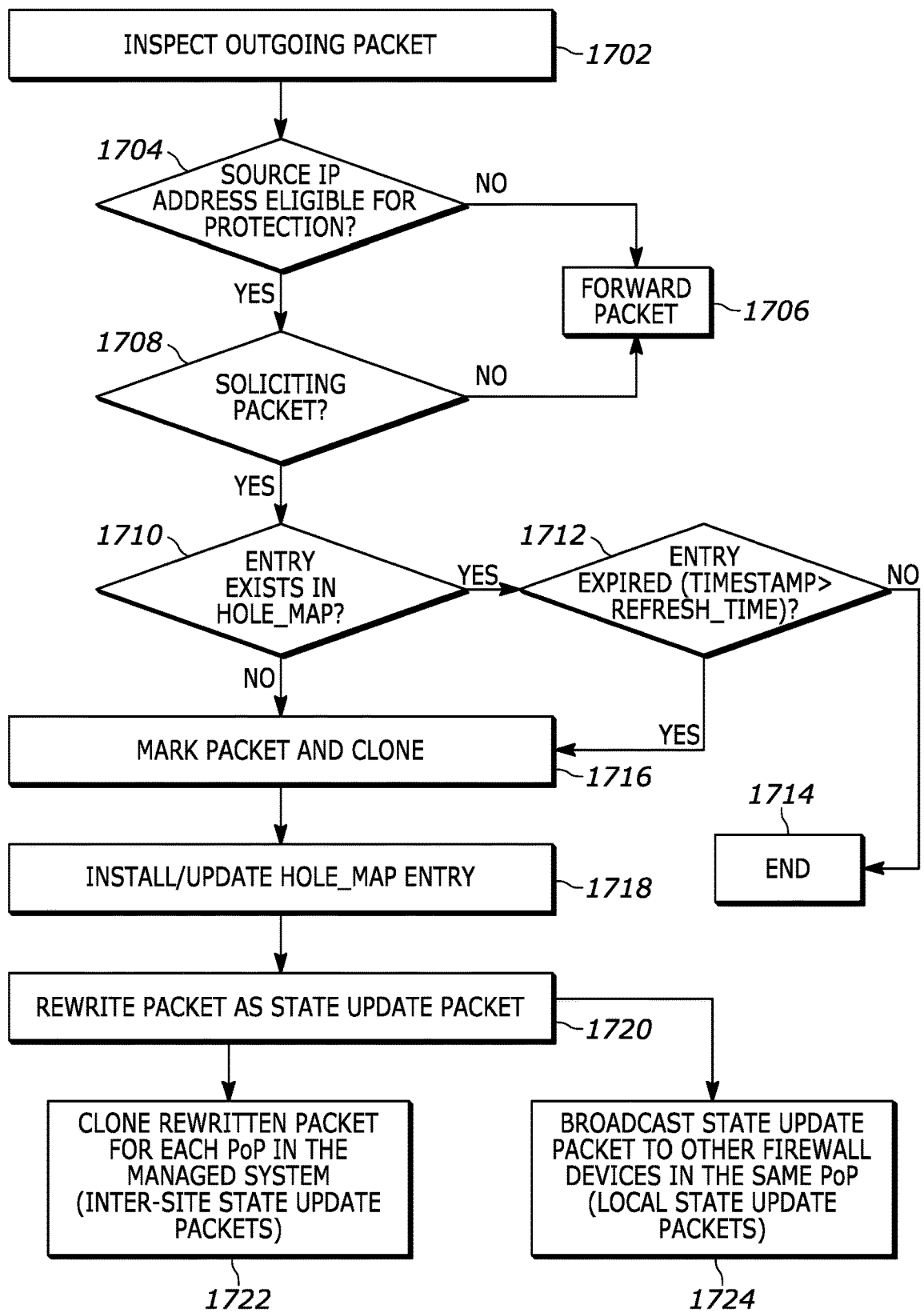
FIG. 17 is a process flow diagram of a method for processing an incoming packet that corresponds to the operations, op_1 and op_2.

FIG. 17 is a process flow diagram of a method for processing an incoming packet that corresponds to the operations, op_1 and op_2, as described above. At block 1702, an outgoing packet is inspected. At decision point 1704, it is determined whether or not a source IP address of the packet is eligible for protection. If the source IP address of the packet is not eligible for protection, then a block 1706, the packets is forwarded as normal. If the source IP address is eligible for protection, then at decision point 1708, it is determined whether or not the packet is a soliciting packet. For example, the determination may be made using criteria as described above with reference to FIGS. 7A-9B. If the packet is not a soliciting packet, then at block 1706, the packet is forwarded as normal. If the packet is determined to be a soliciting packet, then at decision point 1710, it is determined whether or not an entry corresponding to the packet exists in the HOLE_MAP. If an entry exists in the HOLE_MAP, then a decision point 1712, it determined if the entry in the HOLE_MAP has expired (e.g., if TIMESTAMP>REFRESH_TIME). If the entry has not expired, then the process ends at block 1714. If the HOLE_MAP entry has expired, then the process proceeds to block 1716. Returning to decision point 1710, if a corresponding entry does not exist in the HOLE_MAP, then the process proceeds to block 1716. At block 1716, the packet is marked and cloned. At block 1718, an entry that corresponds to the packet is installed in the HOLE_MAP if no entry existed or the entry is updated if a corresponding entry already existed. At block 1720, the packet is rewritten as a state update packet. Then, at block 1722, the rewritten packet can be cloned for each PoP in the managed system to generate inter-site state update packets and at block 1724, the state update packet can be broadcasted to other firewall devices in the same PoP as local state update packets.

Figure 18:
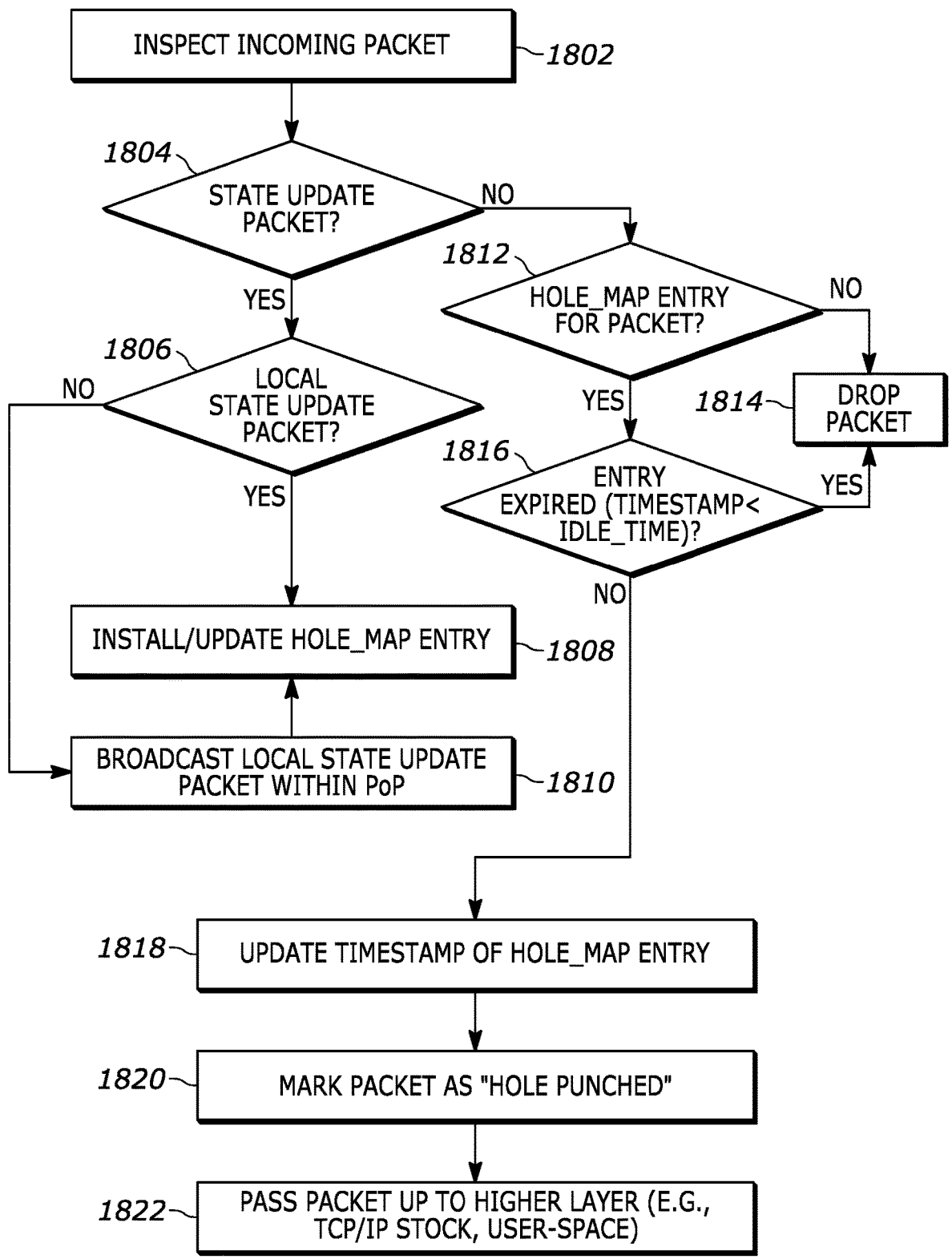
FIG. 18 is a process flow diagram of a method for processing an incoming packet that corresponds to the operations, op_3 and op_4.

FIG. 18 is a process flow diagram of a method for processing an incoming packet that corresponds to the operations, op_3 and op_4, as described above. At block 1802, an incoming packet is inspected. At decision point 1804, it is determined if the incoming packet is a state update packet. For example, state update packets may be identified from a table IP addresses that identify sources that are in the managed system. If the packet is state update packet, then at decision point 1806, it is determined whether or not the state update packet is a local state update packet. If the packet is a state update packet, then at block 1808, a corresponding entry in the HOLE_MAP is installed or updated. If the state update packet is not a local state update packet, then at block 1810, a local state update packet is broadcasted within the PoP and then at block 1808, a corresponding entry in the HOLE_MAP is installed or updated. Returning to decision point 1804, if the packet is not a state update packet, then at decision point 1812, it is determined whether or not there is an entry in the HOLE_MAP that corresponds to the packet (e.g., that matches an IP address of the packet). If there is not a matching entry in the HOLE_MAP, then at block 1814, the packet is dropped. As explained above, dropping such packets can provide protection against DDoS attacks. If there is an entry in the HOLE_MAP that corresponds to the packet, then at decision point 1816, it is determined whether or not the entry has expired (e.g., whether TIMESTMAP<IDLE_TIME). If the entry has expired, then at block 1814, the packet is dropped. However, if the entry has not expired, then at block 1818, a timestamp of the HOLE_MAP entry is updated. At block 1820, the packet is marked at "hole punched," and at block 1822, the packet is passed up to a higher layer (e.g., up to the TCP/IP stack or to the user-space).

Although the state synchronization operations that are implemented below the TCP/IP stack of a monitoring node are described above as being implemented in eBPF bytecode and XDP programs, the state synchronization operations may be implemented below the TCP/IP stack of a monitoring device using other computer executable code, such as another domain-specific packet processing language. For example, the state synchronization operations could be implemented below the TCP/IP stack of the monitoring node using a domain-specific language for programming protocol-independent packet processors, known as "P4." The P4 domain-specific language for programming the data plane of I/O systems such as NICs is currently defined in the "P4$_{16}$ Language Specification," version 1.2.0, as published by the P4 Language Consortium on Oct. 23, 2019. P4 (also referred to as the "P4 specification," the "P4 language," and the "P4 program") is designed to be implementable on a large variety of targets including programmable NICs, software switches, FPGAs, and ASICs.

As used herein, a monitoring node or monitoring device is a computing system that is able to monitor network traffic using the techniques described herein. One example of a monitoring node is a firewall device although a monitoring mode may other types of devices that may not be characterized as firewall devices.

Figure 19:
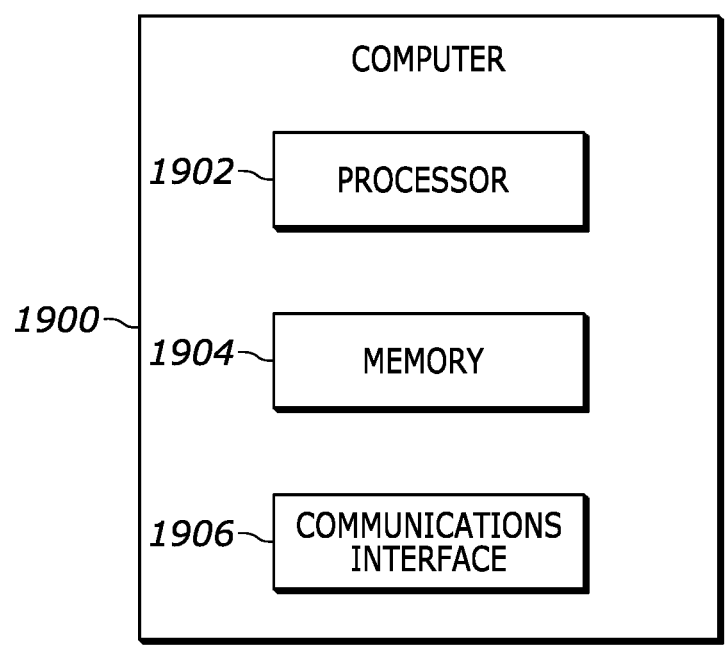
FIG. 19 depicts an embodiment of a computer in which state synchronization operations may be performed.

In an embodiment, the above-described functionality is performed at least in part by a computer or computers (e.g., a host computer and/or a processor of a NIC), which executes computer readable instructions. FIG. 19 depicts a computer 1900 that includes a processor 1902, memory 1904, and a communications interface 1906. The processor may include a multifunction processor and/or an application-specific processor. Examples of processors include the PowerPC™ family of processors by IBM and the x86 family of processors by Intel such as the Xeon™ family of processors and the Intel X5650 processor. The memory within the computer may include, for example, storage medium such as read only memory (ROM), flash memory, Random Access Memory (RAM), and a large capacity permanent storage device such as a hard disk drive. The communications interface enables communications with other computers via, for example, the Internet Protocol (IP). The computer executes computer readable instructions stored in the storage medium to implement various tasks as described above.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Although specific embodiments of the invention have been described and illustrated, the invention is not to be limited to the specific forms or arrangements of parts so described and illustrated. The scope of the invention is to be defined by the claims appended hereto and their equivalents.

What is claimed is:
1. A method for synchronizing state information amongst monitoring nodes, the method comprising:
identifying a packet as a state-related packet by inspecting the packet below a TCP/IP stack in a monitoring node; and
implementing state synchronization operations below the TCP/IP stack of the monitoring node in response to identifying the packet as a state-related packet, wherein the state synchronization operations include updating an allowlist stored as a key-value map in the monitoring node based on the identified packet and generating a state update packet based on the identified packet;
wherein the monitoring node is located at a first Point-of-Presence (PoP), and wherein generating a state update packet includes generating an inter-site state update packet for updating state information at a monitoring node at a second PoP and generating a local state update packet for updating state information at a different monitoring node in the first PoP.
2. The method of claim 1, wherein implementing the state synchronization operations below the TCP/IP stack involves executing kernel-space code to read header information of the packet from a receive buffer of a network interface card (NIC) of the monitoring node before any memory is allocated for the packet in a socket buffer of the monitoring node.

3. The method of claim 1, wherein implementing the state synchronization operations below the TCP/IP stack involves executing an eXpress Data Path (XDP) program in the kernel-space of the monitoring node.

4. The method of claim 1, wherein implementing the state synchronization operations below the TCP/IP stack involves executing an XDP program in a NIC of the monitoring node.

5. A method for synchronizing state information amongst monitoring nodes, the method comprising:
at a first monitoring node;
identifying a packet as a state-related packet by inspecting the packet below a TCP/IP stack of the first monitoring node;
implementing state synchronization operations below the TCP/IP stack of the first monitoring node in response to identifying the packet as a state-related packet, wherein the state synchronization operations include updating a map of the first monitoring node based on the identified packet, and generating a state update packet based on the identified packet; and
transmitting the state update packet from the first monitoring node; and
at a second monitoring node;
receiving the state update packet that was transmitted from the first monitoring node;
identifying the state update packet as a state-related packet by inspecting the state update packet below a TCP/IP stack of the second monitoring node;
implementing a state synchronization operation below the TCP/IP stack of the second monitoring node in response to identifying the state update packet as a state-related packet, wherein the state synchronization operation includes updating a map in the kernel-space of the second monitoring node based on the state update packet.

6. The method of claim 5, wherein:
identifying a packet as a state-related packet and implementing state synchronization operations in the kernel-space of the first monitoring node involves executing eBPF bytecode in the kernel-space of the first monitoring node; and
identifying the state update packet as a state-related packet and implementing the state synchronization operations in the kernel-space of the second monitoring node involves executing eBPF bytecode in the kernel-space of the second monitoring node.

7. The method of claim 6, wherein identifying the state update packet as a state-related packet and implementing the state synchronization operations in the kernel-space of the second monitoring node involves executing an XDP program.

8. The method of claim 5, wherein identifying the state update packet as a state-related packet and implementing the state synchronization operations in the kernel-space of the second monitoring node involves executing kernel-space code at the second monitoring node to read header information of the state update packet from a receive buffer of a NIC of the second monitoring node.

9. The method of claim 8, wherein identifying the state update packet as a state-related packet and implementing the state synchronization operations in the kernel-space of the second monitoring node involves executing an XDP program to read header information of the state update packet from a receive buffer of a NIC of the second monitoring node.

10. The method of claim 5, wherein identifying the state update packet as a state-related packet and implementing the state synchronization operations at the second monitoring node involves executing an XDP program in a NIC of the second monitoring node.

11. The method of claim 5, wherein implementing a state synchronization operation below the TCP/IP stack of the second monitoring node further comprises generating a local state update packet at the second monitoring node and further comprising transmitting the local state update packet from the second monitoring node.

12. The method of claim 11, wherein the local state update packet is generated via execution of eBPF bytecode in the kernel-space of the second monitoring node.

13. The method of claim 11, wherein the local state update packet is generated via execution of an XDP program in the kernel-space of the second monitoring node.

14. The method of claim 11, wherein the local state update packet is generated via execution of an XDP program in a NIC of the second monitoring node.

15. The method of claim 5, wherein identifying the packet as a state-related packet at the first monitoring node involves determining that the packet is received on a trusted interface and determining that the packet is a soliciting packet based on header information of the packet.

16. The method of claim 15, wherein identifying the packet as a state-related packet and implementing state synchronization operations at the first monitoring node involves executing eBPF code in the kernel-space of the first monitoring node.

17. The method of claim 5, wherein the map represents an allowlist and further comprising at least one of dropping packets that are received at an untrusted interface of the first monitoring node and that do not correspond to an entry on the allowlist maintained at the first monitoring node and dropping packets that are received at an untrusted interface of the second monitoring node and that do not correspond to an entry on the allowlist maintained at the second monitoring node.

18. The method of claim 17, wherein packets are dropped in response to packet processing below the TCP/IP stack that utilizes the allowlist.

19. The method of claim 18, wherein the packet processing involves executing an XDP program to read header information of packets from a receive buffer of a NIC of the first and second monitoring nodes.

20. A method for synchronizing state information amongst monitoring nodes, the method comprising:
at a first monitoring node;
identifying a packet as a state-related packet by inspecting the packet in a kernel-space of the first monitoring node;
implementing state synchronization operations in the kernel-space of the first monitoring node in response to identifying the packet as a state-related packet, wherein the state synchronization operations include updating a map in the kernel-space of the first monitoring node based on the identified packet, and generating a state update packet based on the identified packet; and
transmitting the state update packet from the first monitoring node; and
at a second monitoring node;
receiving the state update packet that was transmitted from the first monitoring node;
identifying the state update packet as a state-related packet by inspecting the state update packet in a kernel-space of the second monitoring node;

implementing a state synchronization operation in the kernel-space of the second monitoring node in response to identifying the state update packet as a state-related packet, wherein the state synchronization operation includes updating a map in the kernel-space of the second monitoring node based on the state update packet.

21. The method of claim 20, wherein:
identifying a packet as a state-related packet and implementing state synchronization operations in the kernel-space of the first monitoring node involves executing eBPF bytecode in the kernel-space of the first monitoring node; and
identifying the state update packet as a state-related packet and implementing the state synchronization operations in the kernel-space of the second monitoring node involves executing eBPF bytecode in the kernel-space of the second monitoring node.

22. The method of claim 21, wherein identifying the state update packet as a state-related packet and implementing the state synchronization operations in the kernel-space of the second monitoring node involves executing an XDP program.

23. The method of claim 20, wherein identifying the state update packet as a state-related packet and implementing the state synchronization operations in the kernel-space of the second monitoring node involves executing kernel-space code at the second monitoring node to read header information of the state update packet from a receive buffer of a NIC of the second monitoring node.

24. The method of claim 23, wherein identifying the state update packet as a state-related packet and implementing the state synchronization operations in the kernel-space of the second monitoring node involves executing an XDP program to read header information of the state update packet from a receive buffer of a NIC of the second monitoring node.

25. The method of claim 20, wherein implementing a state synchronization operation in the kernel-space of the second monitoring node further comprises generating a local state update packet in the kernel-space of the second monitoring node and further comprising transmitting the local state update packet from the second monitoring node.

26. The method of claim 25, wherein the local state update packet is generated via execution of eBPF bytecode in the kernel-space of the second monitoring node.

27. The method of claim 25, wherein the local state update packet is generated via execution of an XDP program in the kernel-space of the second monitoring node.

28. The method of claim 25, wherein identifying the state update packet as a state-related packet and generating the local state update packet involves executing kernel-space code at the second monitoring node to read header information of the state update packet from a receive buffer of a network interface card (NIC) of the second monitoring node.

29. The method of claim 25, wherein identifying the state update packet as a state-related packet and generating the local state update packet in the kernel-space of the second monitoring node involves executing an XDP program to read header information of the state update packet from a receive buffer of a NIC of the second monitoring node.

30. The method of claim 20, wherein identifying the packet as a state-related packet at the first monitoring node involves determining that the packet is received on a trusted interface and determining that the packet is a soliciting packet based on header information of the packet.

31. The method of claim 30, wherein identifying the packet as a state-related packet and implementing state synchronization operations at the first monitoring node involves executing eBPF code in the kernel-space of the first monitoring node.

32. The method of claim 20, wherein the map represents an allowlist and further comprising at least one of dropping packets that are received at an untrusted interface of the first monitoring node and that do not correspond to an entry on the allowlist maintained at the first monitoring node and dropping packets that are received at an untrusted interface of the second monitoring node and that do not correspond to an entry on the allowlist maintained at the second monitoring node.

33. The method of claim 32, wherein packets are dropped in response to in-kernel packet processing that utilizes the allowlist.

34. The method of claim 33, wherein the in-kernel packet processing involves executing an XDP program to read header information of packets from a receive buffer of a NIC of the first and second monitoring nodes.

35. A non-transitory computer readable medium that stores computer-executable code, which when executed on one or more processors, implements a method for synchronizing state information amongst monitoring nodes, the method comprising:
at a first monitoring node;
identifying a packet as a state-related packet by inspecting the packet in a kernel-space of the first monitoring node;
implementing state synchronization operations in the kernel-space of the first monitoring node in response to identifying the packet as a state-related packet, wherein the state synchronization operations include updating a map in the kernel-space of the first monitoring node based on the identified packet, and generating a state update packet based on the identified packet; and
transmitting the state update packet from the first monitoring node; and
at a second monitoring node;
receiving the state update packet that was transmitted from the first monitoring node;
identifying the state update packet as a state-related packet by inspecting the state update packet in a kernel-space of the second monitoring node;
implementing a state synchronization operation in the kernel-space of the second monitoring node in response to identifying the state update packet as a state-related packet, wherein the state synchronization operation includes updating a map in the kernel-space of the second monitoring node based on the state update packet.

36. A non-transitory computer readable medium that stores computer-executable code, which when executed on one or more processors, implements a method for synchronizing state information amongst monitoring nodes, the method comprising:
at a first monitoring node;
identifying a packet as a state-related packet by inspecting the packet below a TCP/IP stack of the first monitoring node;
implementing state synchronization operations below the TCP/IP stack of the first monitoring node in response to identifying the packet as a state-related packet, wherein the state synchronization operations include updating a map of the first monitoring node based on the identified packet, and generating a state update packet based on the identified packet; and
transmitting the state update packet from the first monitoring node; and
at a second monitoring node;
receiving the state update packet that was transmitted from the first monitoring node;
identifying the state update packet as a state-related packet by inspecting the state update packet below a TCP/IP stack of the second monitoring node;
implementing a state synchronization operation below the TCP/IP stack of the second monitoring node in response to identifying the state update packet as a state-related packet, wherein the state synchronization operation includes updating a map in the kernel-space of the second monitoring node based on the state update packet.

37. A method for synchronizing state information amongst monitoring nodes, the method comprising:
identifying a packet as a state-related packet by inspecting the packet below a TCP/IP stack in a monitoring node that is located at a first Point-of-Presence (PoP); and
implementing state synchronization operations below the TCP/IP stack of the monitoring node in response to identifying the packet as a state-related packet, wherein the state synchronization operations include;
generating an inter-site state update packet for updating state information at a monitoring node at a second PoP and transmitting the inter-site state update packet from the monitoring node; and
generating a local state update packet for updating state information at a different monitoring node in the first PoP and transmitting the local state update packet from the monitoring node.

38. A non-transitory computer readable medium that stores computer-executable code, which when executed on one or more processors, implements a method for synchronizing state information amongst monitoring nodes, the method comprising:
identifying a packet as a state-related packet by inspecting the packet below a TCP/IP stack in a monitoring node that is located at a first Point-of-Presence (PoP); and
implementing state synchronization operations below the TCP/IP stack of the monitoring node in response to identifying the packet as a state-related packet, wherein the state synchronization operations include;
generating an inter-site state update packet for updating state information at a monitoring node at a second PoP and transmitting the inter-site state update packet from the monitoring node; and
generating a local state update packet for updating state information at a different monitoring node in the first PoP and transmitting the local state update packet from the monitoring node.

39. A non-transitory computer readable medium that stores computer-executable code, which when executed on one or more processors, implements a method for synchronizing state information amongst monitoring nodes, the method comprising:
identifying a packet as a state-related packet by inspecting the packet below a TCP/IP stack in a monitoring node; and
implementing state synchronization operations below the TCP/IP stack of the monitoring node in response to identifying the packet as a state-related packet, wherein the state synchronization operations include updating an allowlist stored as a key-value map in the monitoring node based on the identified packet and generating a state update packet based on the identified packet;
wherein the monitoring node is located at a first Point-of-Presence (PoP), and wherein generating a state update packet includes generating an inter-site state update packet for updating state information at a monitoring node at a second PoP and generating a local state update packet for updating state information at a different monitoring node in the first PoP.

40. A method for synchronizing state information amongst monitoring nodes, the method comprising:
identifying a packet as a state-related packet by inspecting the packet below a TCP/IP stack in a monitoring node; and
implementing state synchronization operations below the TCP/IP stack of the monitoring node in response to identifying the packet as a state-related packet, wherein the state synchronization operations include updating an allowlist stored as a key-value map in the monitoring node based on the identified packet and generating a state update packet based on the identified packet;
wherein implementing the state synchronization operations below the TCP/IP stack involves executing kernel-space code to read header information of the packet from a receive buffer of a network interface card (NIC) of the monitoring node before any memory is allocated for the packet in a socket buffer of the monitoring node.

41. A non-transitory computer readable medium that stores computer-executable code, which when executed on one or more processors, implements a method for synchronizing state information amongst monitoring nodes, the method comprising:
identifying a packet as a state-related packet by inspecting the packet below a TCP/IP stack in a monitoring node; and
implementing state synchronization operations below the TCP/IP stack of the monitoring node in response to identifying the packet as a state-related packet, wherein the state synchronization operations include updating an allowlist stored as a key-value map in the monitoring node based on the identified packet and generating a state update packet based on the identified packet;
wherein implementing the state synchronization operations below the TCP/IP stack involves executing kernel-space code to read header information of the packet from a receive buffer of a network interface card (NIC) of the monitoring node before any memory is allocated for the packet in a socket buffer of the monitoring node.

* * * * *